(12) United States Patent
Hodgart

(10) Patent No.: US 8,509,286 B2
(45) Date of Patent: Aug. 13, 2013

(54) RECEIVER OF MULTIPLEXED BINARY OFFSET CARRIER (MBOC) MODULATED SIGNALS

(75) Inventor: Matthew Stephen Hodgart, Guildford (GB)

(73) Assignee: The University of Surrey (GB)

( * ) Notice: Subject to any disclaimer, the term of this patent is extended or adjusted under 35 U.S.C. 154(b) by 744 days.

(21) Appl. No.: 12/522,032

(22) PCT Filed: Jan. 23, 2008

(86) PCT No.: PCT/GB2008/000206
§ 371 (c)(1),
(2), (4) Date: Dec. 7, 2009

(87) PCT Pub. No.: WO2008/090323
PCT Pub. Date: Jul. 31, 2008

(65) Prior Publication Data
US 2010/0135364 A1  Jun. 3, 2010

(30) Foreign Application Priority Data
Jan. 24, 2007 (GB) .................................. 0701296.6

(51) Int. Cl.
*H04B 1/00* (2006.01)
(52) U.S. Cl.
USPC .......................................... 375/147; 375/316
(58) Field of Classification Search
USPC .... 375/130, 145, 147, 149, 150; 342/357.02, 342/357.59, 357.73, 357.74
See application file for complete search history.

(56) References Cited

U.S. PATENT DOCUMENTS 5,535,278 A * 7/1996 Cahn et al. ..................... 380/274
6,125,135 A * 9/2000 Woo et al. ..................... 375/130

(Continued)

FOREIGN PATENT DOCUMENTS

| | | |
|---|---|---|
| EP | 1 598 677 | 11/2005 |
| EP | 1 681 773 A1 | 7/2006 |
| WO | WO 2004/092761 A1 | 10/2004 |
| WO | WO 2006/027004 | 3/2006 |

OTHER PUBLICATIONS

Hein, G.W.; Avila-Rodriguez, J.-A.; Wallner, S.; Pratt, A.R.; Owen, J.; Issler, J.; Betz, J.W.; Hegarty, C.J.; Lenahan, S.; Rushanan, J.J.; Kraay, A.L.; Stansell, T.A.; , "MBOC: The New Optimized Spreading Modulation Recommended for GALILEO L1 OS and GPS L1C," Position, Location, and Navigation Symposium, 2006 IEEE/ION , vol., No., pp. 883-892.*

(Continued)

*Primary Examiner* — Daniel Washburn
*Assistant Examiner* — Fitwi Hailegiorgis
(74) *Attorney, Agent, or Firm* — Cook Alex Ltd.

(57) ABSTRACT

A receiver for receiving a navigation signal comprising a carrier modulated by a code modulation function of a given code rate and further modulated by a composite sub-carrier modulation function having first and second components with two different rates both of which are different to the code rate, the receiver comprising processing means arranged to: generate a first estimate of delay based on the code modulation only; generate a second estimate of delay based on the first component of the sub-carrier modulation only; and generate a third estimate of delay based on the second component of the sub-carrier modulation only; and determine a further delay estimate from the first second and third delay estimates.

13 Claims, 9 Drawing Sheets

(56) References Cited

U.S. PATENT DOCUMENTS

| | | | | |
|---|---|---|---|---|
| 6,404,801 | B1* | 6/2002 | Lennen | 375/134 |
| 6,463,091 | B1* | 10/2002 | Zhodzicshsky et al. | 375/149 |
| 6,658,048 | B1* | 12/2003 | Valio | 375/150 |
| 6,922,167 | B2* | 7/2005 | Gerein | 342/357.74 |
| 7,064,707 | B2* | 6/2006 | Martin | 342/357.59 |
| 7,440,493 | B2* | 10/2008 | Pietila et al. | 375/150 |
| 7,471,241 | B1* | 12/2008 | Yang | 342/357.73 |
| 7,508,865 | B2* | 3/2009 | Miller et al. | 375/150 |
| 7,916,771 | B2* | 3/2011 | Julien et al. | 375/145 |
| 2004/0071200 | A1* | 4/2004 | Betz et al. | 375/152 |
| 2005/0248483 | A1* | 11/2005 | Martin | 342/357.02 |
| 2010/0135364 | A1 | 6/2010 | Hodgart | |

OTHER PUBLICATIONS

Olivier Julien, Christophe Macabiau, M. Elizabeth Cannon, Gerard Lachapelle, "ASPeCT: Unambiguous Sine-BOC(n,n) Acquisition/Tracking Technique for Navigation Applications", IEEE Transactions on Aerospace and Electronic Systems, vol. 43, No. 1, Jan. 2007; pp. 150-162.

M. Stephen Hodgart, Paul D. Blunt, Martin Unwin, "Double Estimator A New Receiver Principle for Tracking BOC Signals", InsideGNSS, Spring 2008; pp. 20-29, www.insidegnss.com.

Pratibha B. Anantharamu, Daniele Borio, Gerard Lachapelle, "Pre-Filtering, Side-Peak Rejection and Mapping: Several Solutions for Unambiguous BOC Tracking", ION GNSS 2009, Session F5, Savannah, GA, Sep. 22-25, 2009; pp. 1-14.

Nicolas Martin, Herve Guichon, "BOC ambiguity resolution aided by virtual sub-carrier tracking for multi-path mitigation", (8 pages), GNSS 2009.

Olivier Julien, Christophe Macabiau, Emmanuel Bertrand, "Analysis of Galileo E1 OS unbiased BOC/CBOC tracking Techniques for Mass Market Applications", (8 pages), 2010 IEEE.

Alexander Ruegamer, Ion Suberviola, Frank Foerster, Guenter Rohmer, Andriy Konovaltsev, Nikola Basta, Michael Meurer, Jan Wendel, Melanie Kaindl, Stefan Baumann, "A Bavarian Initiative towards a Robust Galileo PRS Receiver", (11 pages), From: http://elib.dlr.de/71147/1/BaSE_Paper_final_ION.pdf., ION 2011.

J. Alegre-Rubio, C. Palestini, G. Lopez-Risueno, G. Corazza, "Code Tracking of High-Order BOC modulations in the Presence of Signal Distortion and Multipath", (15 pages), GNSS 2011.

UK Search Report under Section 17(5) for Application No. GB0624516.1 dated Jun. 28, 2007.

International Search Report and Written Opinion for PCT/GB2007/003050 dated Nov. 27, 2007.

Preliminary Report on Patentability for PCT/GB2007/003050 dated Feb. 10, 2009.

Lin, V., et al., "Study of the Impact of False Lock Points in Subcarrier Modulated Ranging Signals and Recommended mitigation Approaches", ION Annual Meeting, Jun. 23, 2003.

Ward, P.W., "A Design Technique to Remove the Correlation Ambiguity in Binary Offset Carrier (BOC) Spread Spectrum Signals" Proceedings of the ION National Technical Meeting, Jan. 26, 2004.

Fabio, Dovis, et al., "A Novel Algorithm for the Code Tracking of BOC (n,n) Modulated Signals", ION GNSS 18th International Technical Meeting, Sep. 15, 2005.

USPTO Non-Final Office Action dated Oct. 13, 2011 for U.S. Appl. No. 12/376,017.

USPTO Final Office Action dated Mar. 21, 2012 for U.S. Appl. No. 12/376,017.

Notification of Transmittal of the International Search Report and Written Opinion for PCT/GB2008/000206 dated May 30, 2008.

PCT International Preliminary Report on Patentability for PCT/GB2008/000206 dated Jul. 28, 2009.

UK Intellectual Property Office Search Report under Section 17(5) for GB Application No. GB0701296.6 dated May 14, 2007.

Kim, S., et al., "A Novel Unambiguous Multipath Mitigation Scheme for BOC(kn n) Tracking in GNSS", Proceedings of the 2007 International Symposium on Application, IEEE, 4 pages, dated 2007.

Lohan, E.,et al, Correlation properties of Multiplexed Binary Offset Carrier (MBOC) modulation, Institute of Communications Engineering, Tampere University of Technology, 7 pages, 2007.

Nunes, F., et al. "Innovations-based Coe Discriminator for GPS/Galileo BOX Signals", Instituto de Telecomunicaoes, Lisboa, Portugal, IEEE 2004, pp. 4127-4131.

* cited by examiner

RECEIVER OF MULTIPLEXED BINARY OFFSET CARRIER (MBOC) MODULATED SIGNALS

FIELD OF THE INVENTION

The present invention relates to the reception of Multiplexed Binary Offset Carrier (MBOC) modulated signals and similar such signals. One particular application of the invention is the reception of MBOC modulated navigation signals in a Global Navigation Satellite System (GNSS).

BACKGROUND TO THE INVENTION

In a GNSS, a receiver estimates delays $\tau$ in the navigation signals received from different satellites and uses this information, combined with information on the position of the satellites, to estimate its position. The more accurate the estimation of the delays $\tau$, the more accurately the receiver can estimate its position.

The United States led Global Positioning System (GPS) is presently the GNSS in most common use. Navigation signals transmitted by GPS satellites are modulated using a Phase Shift Keying (PSK) modulation of a code onto a carrier signal having a designated carrier frequency. The modulation involves altering the phase of the carrier signal by fixed amounts (0 or $\pi$) at a code rate $f_C$, each symbol of the code having duration $T_C=1/f_C$ and the code being repeated with time period $T_G$. A navigation signal received at a receiver from a satellite can therefore be represented by an equivalent bi-modal amplitude modulation function $\alpha(t-\tau)\epsilon(-1,+1)$ with period $T_G$, as shown in FIG. 1.

The receiver estimates the delay $\tau$ by comparing the received signal to a locally generated reference signal. The reference signal consists of an in-phase and quadrature-phase (I and Q) carrier modulated with the same code as the input signal. The reference modulation can be represented mathematically as $a(t-\hat{\tau})$ where $\hat{\tau}$ is a trial delay. The comparison typically consists in multiplying the received signal by the I and Q reference to yield a demodulated signal. The demodulated signal is then integrated over a given time, usually the same as the period $T_G$ of the code, to output a value known as a correlation. The correlation depends on the difference between the trial delay $\hat{\tau}$ of the reference signal and the true delay $\tau$ of the received signal and can be expressed as a correlation function $\Lambda(\hat{\tau}-\tau)$. As shown in FIG. 2, this correlation function for a PSK modulated signal is triangular and peaks when the trial delay $\hat{\tau}$ matches the true delay $\tau$ The width of the correlation function is twice the symbol duration $T_C$, i.e. $2T_C$.

Calculating the entire correlation function $\Lambda(\hat{\tau}-\tau)$ over all $\hat{\tau}$ and analysing it to determine its peak and hence identify the delay $\tau$ of the received signal is a computationally time-consuming task. Most conventional GPS receivers therefore compute just three sampled correlations simultaneously, using three reference signals offset in time from one another. The three correlations are usually referred to as gate values of Early (E), Prompt (P) and Late (L) gates. The E and L gates are offset from one another by a time separation $T_{DC}$, so that they can be considered to have trial delays $$\hat{\tau} - \frac{T_{DC}}{2} \text{ and } \hat{\tau} + \frac{T_{DC}}{2}$$

respectively. The P gate can then be considered to have trial delay $\hat{\tau}$ half way between these trial delays of the E and L gates. So, as illustrated in FIG. 2, when the E and L gate values are equal, the P gate value yields the peak value of the correlation function $\Lambda(\hat{\tau}-\tau)$ and the trial delay $\hat{\tau}$ is equal to the true delay $\tau$.

An iterative algorithm can be used to arrive at this state. When the trial delay $\hat{\tau}$ is not equal to the true delay, the P gate will be offset from the peak of the correlation function $\Lambda(\ )$ and there will be a difference in the values of the E and L gates. So, an error signal proportional to the difference between the trial delay $\hat{\tau}$ and the true delay $\tau$ can be generated by subtracting the E gate value from the L gate value. This can be used to iteratively adjust the trial delay $\hat{\tau}$ toward the true delay $\tau$. A best estimate of the true delay is then deemed to be the value of the trial delay (of the P gate) when the E gate value is equal to the L gate value (as shown in FIG. 2).

It is presently intended to improve the American GPS by adding new navigation signals to the system. The independent European Galileo system will use similar new navigation signals in both the same and new frequency bands. While some of the new navigation signals will continue to use PSK modulation, most of them will be modulated using the new Binary Offset Carrier (BOC) modulation which is described first. An important sub-set of BOC is called Multiplexed binary offset carrier and is described next.

BOC Modulation.

BOC modulation is like PSK in that it involves modulating a code onto a carrier. The code is similar to that used in PSK modulation, and the code in the received signal can again be represented by an equivalent bi-modal amplitude modulation function $a(t-\tau)$ having code rate $f_C$, symbol duration $T_C$ and periodicity $T_G$. However, BOC involves further modulating the signal by a sub-carrier, which can be represented by a sub-carrier modulation function $s(t-\tau)$ having sub-carrier rate $f_s$ and sub-symbol duration equivalent to a half-cycle $T_S=1/(2f_S)$. As seen in FIG. 3, the sub-carrier modulation function $s(t-\tau)$ is a simple periodic square waveform. The sub-carrier rate $f_s$ is an integer multiple, or an integer-and-a-half multiple of the code rate $f_C$. The standard notation for BOC modulation reads BOC($f_s$, $f_C$). This figure shows what can be called 'sine-BOC' where the sub carrier has 0 deg phase shift relative to the code zero crossings. Also there is 'cosine-BOC' where the sub-carrier is phase shifted 90 deg relative to the code zero-crossings (not shown).

When a received BOC signal is correlated using a matching locally generated BOC reference signal the resulting correlation function $\mathcal{W}(\hat{\tau}-\tau)$ has multiple peaks. For example, referring to FIG. 4a, this correlation function of a sine-BOC signal modulated using BOC(2f, f) has three positive peaks and four negative peaks. The central positive peak corresponds to a match of the true delay $\tau$ of the received signal with the trial delay of the reference signal. The other, secondary peaks are separated at intervals of the sub-symbol duration $T_s$. Importantly, the envelope (dashed line) of this correlation function $\mathcal{W}(\hat{\tau}-\tau)$ is the same as the correlation function $\Lambda(\hat{\tau}-\tau)$ of a PSK modulated signal having the same code rate $f_C$.

Because the central peak of the BOC correlation function $\mathcal{W}(\hat{\tau}-\tau)$ has steeper sides than the peak of the equivalent PSK correlation function $\Lambda(\hat{\tau}-\tau)$, BOC modulation has the potential to allow more accurate delay estimation. Specifically, when the E and L gates are located on either side of the central peak then the error signal generated from the difference between the L gate value and the E gate value can steer the P gate to the top of the central peak and hence the trial delay $\hat{\tau}$ to the true delay τ, as illustrated in the top part of FIG. 4a. There is however an inherent ambiguity in the delay estimate for a BOC signal provided by the conventional delay estimation technique, as described above. When the E and L gates reside on either side of one of the secondary peaks, the error signal will steer the P gate to the secondary peak (which can be negative). In that situation, the error signal will be zero, just as it is when the P gate is at the top of the central peak, and the iteration will have converged to a value of the trial delay $\hat{\tau}$ that does not correspond to the true delay τ. This is known as 'false lock' or 'slip', or 'false node tracking'.

A number of techniques have been proposed for overcoming this problem with pure BOC. One such technique, commonly referred to as 'bump jumping', is described in the paper "Tracking Algorithm for GPS Offset Carrier Signals", P. Fine et al, Proceedings of ION 1999 National Technical Meeting, January 1999. This technique takes advantage of the knowledge that adjacent peaks of the BOC correlation function $\mathcal{W}(\hat{\tau}-\tau)$ are separated from one another by the known sub-carrier symbol duration $T_S$. Specifically, the technique tests for correct location of the P gate using a pair of gates, called Very Early (VE) and Very Late (VL) gates, having trial delays $\hat{\tau}-T_S$ and $\hat{\tau}+T_S$ respectively. These are offset from the trial delay $\hat{\tau}$ of the P gate by the sub-carrier symbol duration $T_S$. So, if the P gate has converged to the top of one of the peaks, e.g. the receiver is in lock, the VE, P and VL gates are located on three adjacent peaks. At this stage, the VE, P and VL gate values are compared. If the VE and VL gate amplitudes are less than the P gate amplitude, the P gate is known to lie on the central peak and the trial delay $\hat{\tau}$ corresponds to the true delay. However, if the VE or VL gate amplitude is higher than the P gate value, the P gate is on a secondary peak. In this event, the trial delay $\hat{\tau}$ is incremented by the sub-symbol duration $T_s$ in the direction of whichever of the VE and VL gates has the higher (modulus) value. This action should cause the P gate to jump to the next peak toward the central peak. The comparison is then repeated to verify that the P gate is on the central peak or to cause repeated incrementing of the trial delay $\hat{\tau}$ until the P gate is located on the central peak.

Bump jumping allows a receiver to fully exploit the potential accuracy of BOC. However, there can be a significant waiting time before the delay estimate can be relied on. There is an elapsed time required to decide whether there is a false lock or not. This is longer for a low $C/N_0$, when the VE, P and VL gate values must also be averaged over a significant time in order to be sure which of the three tested adjacent peaks has the highest amplitude. The required time to detect false lock also increases proportionally with the ratio of the sub-carrier rate to the code rate $f_S/f_C$, because the difference of amplitude between adjacent peaks relatively decreases. It may also be necessary to correct false lock several times over successive secondary peaks before the central peak is found, a problem which is exacerbated as the ratio of the sub-carrier rate to the code rate $f_S/f_C$ increases, because the number of secondary peaks increases. Overall, the waiting time may range upwards to several seconds, which is certainly enough to have potentially disastrous consequences for a plane landing, ship docking or such like. Worse, the receiver does not know that it has been in a false lock state until it actually jumps out of it. The bump jumping system therefore is not fail safe.

A further difficulty has now been realised since the launch of the first test satellite GIOVE-A transmitting BOC signals in December 2005. Non-linear and linear distortion in the transmitting chain can easily cause appreciable asymmetry in the actual correlation function $\mathcal{W}(\hat{\tau}-\tau)$—where the corresponding secondary peaks on either side of the main peak are no longer equal in amplitude. This inevitably degrades performance, and in a worst case, the bump-jumping receiver simply does not work. Recent practical tests are described in "GIOVE-A in orbit testing results" M. Falcone, M. Lugert, M. Malik, M. Crisic, C. Jackson, E. Rooney, M. Trethey ION GNSS Fort Worth Tex., September 2006.

FIG. 4b is a simulation of the effect of extreme phase distortion (90 deg). It shows that the later (negative) secondary peak has the same amplitude as the (positive) primary peak. In such a case the VEVL receiver must fail. For less extreme phase distortion—the unbalancing must degrade signal to noise performance, simply because it brings the amplitude of one of the secondary peaks closer to the amplitude of the primary peak.

The paper "Unambiguous Tracker for GPS Binary-Offset-Carrier Signals", Fante R., ION 59th Annual Meeting/CIGTF 22nd Guidance Test Symposium, 23-25 Jun. 2003, Albuquerque, N. Mex., describes another technique involving multiple sampling (gating) of the correlation function and then linear combination of these samples to synthesise a monotonic approximation to the PSK correlation function $\Lambda(\hat{\tau}-\tau)$ having no multiple peaks. This solution certainly eliminates false locks. However, this technique relies on a very complex receiver design. More fundamentally, it fails to realise the potential accuracy conferred by BOC modulation, because the shallower PSK correlation peak is relied on to resolve the delay estimate. Similarly, the paper "BOC(x, y) signal acquisition techniques and performances", Martin et al., Proceedings of ION GPS 2003, September 2003, Portland, Oreg., describes a technique that exploits the fact that the BOC modulated signal has a mathematical equivalence to two PSK modulated signals centred on two separate carrier frequencies; where the higher frequency $f_H$ is equal to the carrier frequency plus the sub-carrier frequency $f_S$ while the lower frequency $f_L$ is equal to the carrier frequency minus the sub-carrier frequency $f_S$. With appropriate processing the actual monotonic PSK correlation function) $\Lambda(\hat{\tau}-\tau)$ can be recovered. But this method is again complex to implement and more fundamentally fails to realise the potential accuracy conferred by BOC modulation.

The solution—described in detail in patent application GB0624516.1—is to eliminate the problem by eliminating the correlation $\mathcal{W}()$. Instead, a two dimensional correlation is tracked independently to realise a dual estimate. An unambiguous lower accuracy estimate derived from the code phase is used to make an integer correction to a higher accuracy but ambiguous independent estimate based on the sub-carrier phase. The actual receiver may adopt a triple loop, instead of the usual double loop, where carrier phase, sub-carrier phase and code phase are tracked independently but interactively.

MBOC Modulation.

Multiplexed binary offset carrier (MBOC) has been proposed in an important modification of BOC. See "MBOC—the new optimized spreading modulation recommended for L1 O and GP L1C" published May/June 2006 *Inside GNSS*. The proposal is authored and agreed by international experts G. W. Hein, J-Avial Rodriguez, S Wallner, J. W. Betz, C. J. Hegarty, J. J. Rushanan A. L. Kraay, A. R. Pratt, S. Lenahan, J. Owen, J-L Issler and T. Stansell. When adopted it will add a further layer of complexity to reception of GNSS signals compared to ordinary BOC modulation, which is in turn more complicated than PSK modulation. It offers improved accuracy and better rejection of multi-path.

The basis is to make the sub-carrier modulation a linear superposition of BOC(1,1) and BOC(6,1). A common agreed code is described as MBOC(6,1,1/11). The notation implies that 1/11 of the total power is the BOC(6,1) component—and 10/11 of the power is the BOC(1,1) component. The linear superposition can be done by time domain multiplexing where 1/11 of the BOC(1,1) symbols are replaced by BOC (6,1) symbols (same chip width $T_C=1$ µs) having same amplitude (TMBOC). The currently favoured alternative is in the frequency domain multiplexing where there is continuous modulation with unequal amplitudes of the two components (CBOC). Whichever form is adopted makes no difference to the invention. Current proposals divide power into data channel and pilot channel. One current proposal assumes a 50-50 division of power and with no BOC(6,1) component in the data channel, putting it all in the pilot channel. On that basis then the relative proportions of the two components in the pilot channel is 9/11 of BOC(1,1) and 2/11 of BOC(6,1) for which an example is shown in FIG. 5. Whatever proportions are finally decided makes no difference to the invention.

The difference from BOC is clearly seen in the form of a doubly periodic modulation with half periods described by two different sub-chip widths $T_{S1}$ and $T_{S2}$. When recovered in the conventional single estimate receiver an even more complicated correlation function as in FIG. 6a is the result. We shall adopt the notation ᴠ⋀ᴠ ( ) for the correlation function. Not only are there two secondary (negative) peaks but there are also multiple tertiary peaks. In comparison with the ordinary correlation function for BOC(1,1)—shown as dotted— the slope magnitudes either side of the main peak are higher—which quantifies as an improved accuracy if tracking is correct. But clearly the new modulation offers many more opportunities for false tracking on the 'ripples' in the correlation function—for example as in FIG. 6b, when the gate width is narrow, as it has to be for potentially accurate tracking. These figures are for ideal shapes with no phase distortion. As might be expected the new MBOC is more sensitive to phase distortion than BOC. The synthesised effect of phase distortion is shown in FIG. 6c (with 50 deg distortion on BOC(6,1,1/11) where it is clear that the correlation function cannot be tracked because there is a secondary peak equal in amplitude to the primary peak. The complexities of equalization will be needed therefore in order to realize an adequately symmetrical function. At the present time MBOC is so new that no proposals have been published on how to design a receiver to overcome the problems that this complex modulation will entail.

The present invention overcomes the problem of tracking MBOC. The solution is to eliminate the problem by eliminating the correlation function ᴠ⋀ᴠ ( ). Instead, a three dimensional correlation is tracked independently to realise a triple estimate. An unambiguous lower accuracy estimate derived from the code phase is used to make an integer correction to a higher accuracy but ambiguous independent estimate based on the lower frequency sub-carrier phase which in turn is used to make an integer correction to even higher accuracy but ambiguous independent estimate based on the higher frequency sub-carrier phase. The actual receiver may adopt a quadruple loop, instead of the usual double loop, where carrier phase, sub-carrier$_2$ phase, sub-carrier$_1$ phase and code phase are tracked independently but interactively.

SUMMARY OF THE INVENTION

According to a first aspect of the present invention, there is provided a receiver for receiving a navigation signal comprising a carrier modulated by a code modulation function of a given code rate and further modulated by a composite modulation function which is the sum of two different sub-carriers with unequal rates and which rates are different to the code rate the receiver comprising processing means arranged to:

generate a first estimate of delay based on the code modulation only;

generate a second estimate of delay based on the lower frequency component of the sub-carrier modulation only generate a third estimate of delay based on the higher frequency component of the sub-carrier modulation only, and determine a single delay estimate from the first, second and third delay estimates.

The present invention further provides a receiver for receiving a navigation signal comprising a carrier modulated by a code modulation function of a given code rate and further modulated by a composite sub-carrier modulation function having first and second components with two different rates both of which are different to the code rate, the receiver comprising processing means arranged to:

generate a first estimate of delay based on the code modulation;

generate a second estimate of delay based on the first component of the sub-carrier modulation; and generate a third estimate of delay based on the second component of the sub-carrier modulation; and determine a further delay estimate from the first second and third delay estimates.

The present invention still further provides a receiver for receiving a navigation signal comprising a carrier modulated by a code modulation function of a given code rate and further modulated by a composite sub-carrier modulation function having first and second components with two different rates both of which are different to the code rate, the receiver comprising processing means arranged to:

generate independently first, second and third estimates of delay based on the code modulation, the first component of the sub-carrier modulation, and the second component of the sub-carrier modulation respectively; and determine a further delay estimate from the first second and third delay estimates.

The essence of some embodiments of the invention is that it estimates the signal delay in three independent ways and then combines all three estimates to arrive at one overall signal delay estimate. If prior art is applied to MBOC the receiver would correlate the modulation in the received signal with only a single modulation function, which is the combination of the code modulation and the composite sub-carrier modulation. Up to now dealing with the correlation function ᴡ⋀ᴡ ( ), as in FIG. 6 which results from this action, has been considered unavoidable, because the combined modulation has been perceived to be intrinsic and inseparable. Some embodiments of the invention contradict this perception. They recognise that correlating the received signal with the component sub-carrier modulation function and code modulation function can be done separately, so avoiding the need to contemplate the conventional correlation function. They further recognise that the two components in the composite sub-carrier can be tracked separately.

In some embodiments of the invention the delay in the MBOC signal is estimated in three different and independent ways—in a triple estimate. A first non-ambiguous lower accuracy estimate is used to resolve the ambiguities in a second higher accuracy estimate. This first estimate is derived only from the phase of the code modulation in the BOC signal; it treats the BOC modulation as a 'virtual'PSK and ignores the two sub carrier components. A second estimate is derived only from the phase of low frequency component sub carrier modulation in the MBOC signal and ignores the code and the high frequency component sub carrier. A third estimate is derived only from the phase of high frequency component sub carrier modulation in the MBOC signal and ignores both the code and the lower frequency sub-carrier. The code estimate resolves the ambiguity in the second estimate which in turn resolves the ambiguity in the third even higher accuracy estimate.

A four-loop receiver can be used for the optimal triple estimate of the delay in a selected MBOC transmission. In some embodiments an inner delay-locked loop (DLL) tracks the delay as embodied in the code phase; a lower frequency sub-carrier locked loop ($SLL_1$) independently tracks the same delay as embodied in the first component sub-carrier phase, while a higher frequency sub-carrier locked loop ($SLL_2$) independently tracks the same delay as embodied in the second component sub-carrier phase. Thus three independent delay estimates are calculated. A fourth outer loop may track and lock to the carrier phase and/or frequency of the particular satellite signal. All four loops may operate simultaneously, independently yet co-operatively. This implementation may be contrasted with a conventional receiver which uses only two loops, where the single delay estimate is derived from the tracking of the correlation function in a delay-locked loop (DLL) while in parallel and simultaneously the carrier phase and/or frequency is tracked by a second phase locked loop (PLL) or frequency locked loop (FLL).

By virtue of the triple estimate principle in some embodiments of this invention the MBOC correlation function  ( ) with its secondary and tertiary peaks does not exist and there are no secondary peaks or triple peaks on which a false lock would occur.

In some embodiments of a four-loop receiver the DLL locks to the peak of the same $\Lambda(\ )$-shaped function as the standard GPS, so ensuring a smooth and non-ambiguous acquisition of a delay estimate. The $SLL_1$ however locks to the nearest peak of the continuous first sub-carrier correlation function—which is a triangular function of periodicity of the low frequency sub-carrier component. This loop estimate has higher accuracy but has an inherent ambiguity in integer multiples of first sub-carrier half cycles. There is no 'wrong peak' in this concept however and this ambiguity is acceptable. For, in a further step, the ambiguity in this $SLL_1$ estimate is automatically and instantly resolved by comparison with the DLL estimate.

The $SLL_2$ however, in some embodiments, locks to the nearest peak of the continuous second sub-carrier correlation function—which is a triangular function of periodicity of the high frequency sub-carrier component. This loop estimate has higher accuracy but has an inherent ambiguity in integer multiples of second sub-carrier half cycles. There is no 'wrong peak' in this concept however and this ambiguity is acceptable. For, in a further step, the ambiguity in this SLL2 estimate is automatically and instantly resolved by comparison with the corrected SLL1 estimate.

The combination of $SLL_2$, $SLL_1$ and DLL estimates can now provide the inherently higher accuracy due to MBOC modulation on the signal (comparing with PSK on the basis of the same chip rate), with the ambiguity now resolved.

Because the allocated power to the lower frequency sub-carrier is much higher than allocated to the higher frequency sub-carrier an optimal linear combination may be made of the two SLL estimates to generate a fourth estimate with even higher accuracy.

Simulations show smooth consistent operation of this joint estimation process even in conditions of poor signal to noise.

The four-loop receiver can be implemented with the same variety of options that are available to two loop receivers. The standard option is to track the phase of the carrier—as in so-called 'coherent DLL' where the outer loop is phase locked to the carrier, using a phase discriminator. An alternative is to track the frequency of the carrier—as in so-called 'incoherent DLL' where the outer loop is frequency locked to the carrier, using a frequency discriminator. Various possible phase and frequency discriminators can be used.

Various possible discriminators for the two SLLs can also be used. A variety of standard discriminators for the DLL loop can also be used. In particular the options between coherent early late processing (CELP) and non-coherent early late processing (NELP) continue to be available not only to the code discriminator on the DLL, but also for the sub-carrier tracking on the SLLs. Known technologies and variants, including methods for reducing effect of multipath and currently used in two-loop system will transfer to the new four loop system without complication.

In some embodiments the received signal could more than two, for example three sub-carrier modulation components, in which case a quadruple estimate could be made Preferred embodiments of the invention are now described, by way of example only, with reference to the accompanying drawings.

DETAILED DESCRIPTION OF THE PREFERRED EMBODIMENTS

Figure 7:
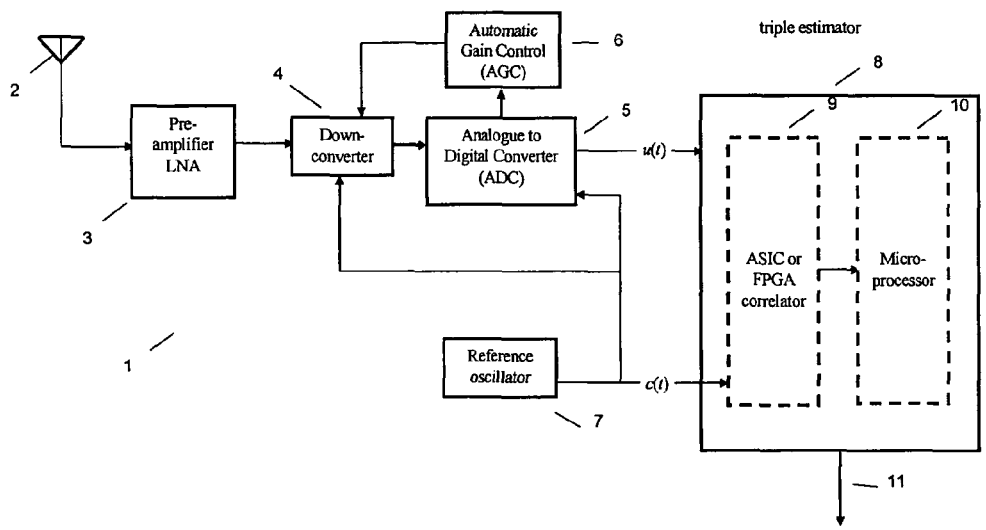
FIG. 7 is a schematic illustration of the overall MBOC receiver according to a first preferred embodiment of the invention.

Referring to FIG. 7, an MBOC receiver 1 according to a first preferred embodiment of the present invention is arranged to receive a MBOC modulated signal via a right-hand circularly polarised antenna 2. The antenna 2 feeds the received signal to a pre-amplifier 3, which includes a filter for filtering the received signal, a circuit for blocking strong interfering signals and a Low Noise Amplifier (LNA) for amplifying the received signal. The LNA effectively sets the receiver's noise figure, normally around 2 dB, and provides around 30 dB gain. The pre-amplifier 3 feeds the filtered, amplified signal to a down-converter 4 for a first stage down-conversion of the signal to a suitable intermediate frequency (IF). The signal is down-converted in multiple stages and filtered to eliminate unwanted image signals.

The down-converter 4 feeds the down-converted signal to an Analogue to Digital Converter (ADC) 5 for converting the signal to the digital domain. The ADC 5 can quantise the signal to one, two or more bits. In this embodiment, because the ADC 5 uses multi-bit quantisation, the receiver 1 incorporates an automatic gain control (AGC) circuit 6 to maintain proper distribution of the signal across the quantisation levels. The output of the AGC circuit 6 feeds back to the down-converter 4 to enable control of the signal level input to the ADC 5 and hence maintain proper amplitude distribution of the signal output by the ADC 5. The ADC 5 is arranged to output the digital signal u(t) to the triple-estimator 8. This has a correlator stage 9 and a processing stage 10. In this embodiment, the triple estimator 8 is implemented in hardware. So, the correlator stage 9 comprises an Application Specific Integrated Circuit/Field Programmable Gate-Array (ASIC/FPGA) and the processing stage 10 is a microprocessor. The triple estimator 8 estimates the delay $\tau$ between transmission and reception of the received signal and outputs the delay estimate via output 11. A clock signal c(t) from reference oscillator at 7 is provided to the down-converter 4, ADC 6 and the triple estimator 8.

Figure 8:
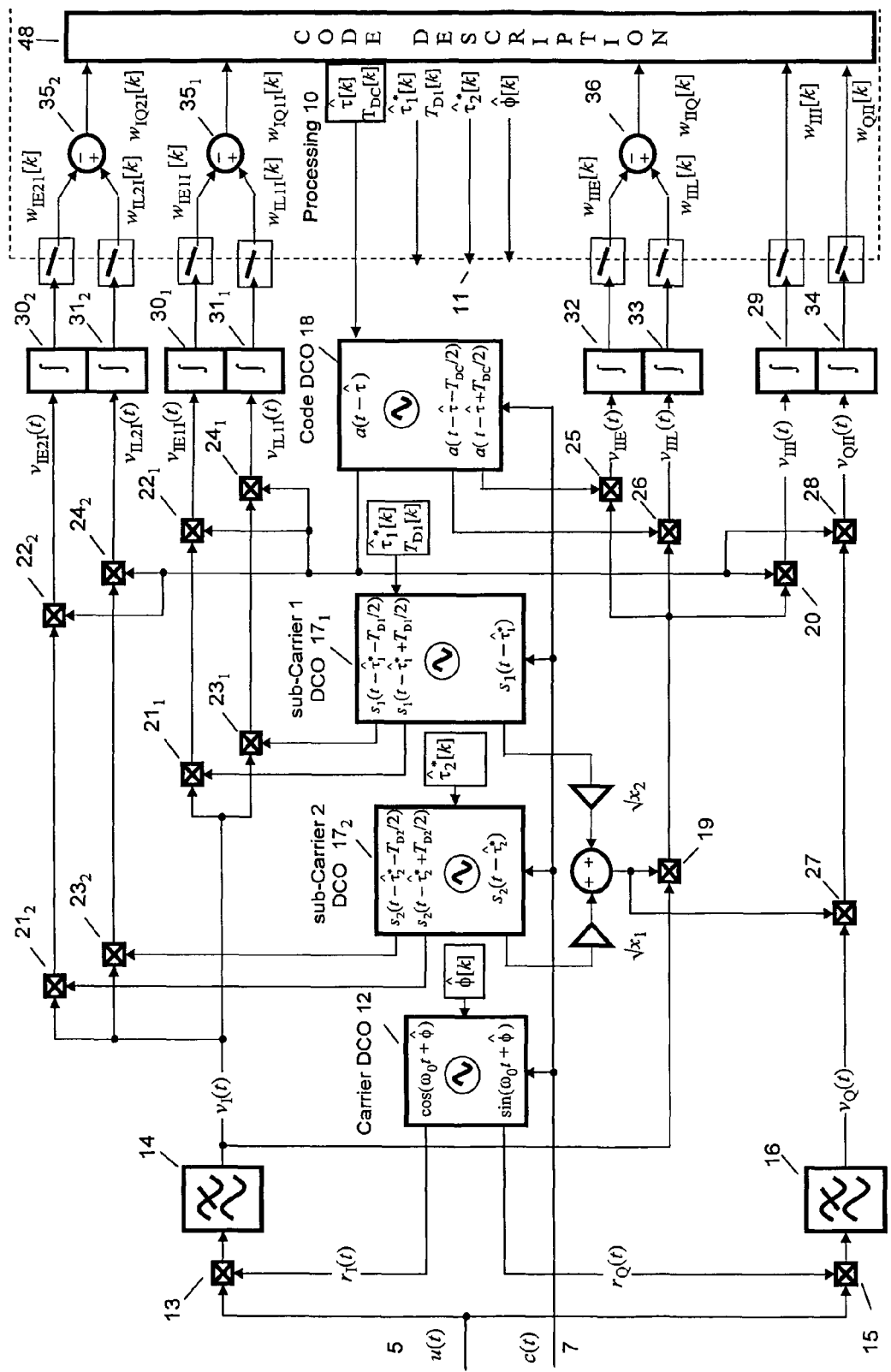
FIG. 8 is a functional expansion of the correlation part 9 of a receiver.

FIG. 8 shows a detailed functional description to the correlator 9. The input signal u(t) splits into an upper in-phase and lower quadrature arm and is processed through four stages. The incoming signal is mixed with replica carrier, sub carrier 2, and sub carrier 1 and code waveforms, each generated by separate digitally controlled oscillators (DCO) 12, 17$_2$, 17$_1$ 18 respectively. First there is multiplication by a phase or quadrature reference signal from the carrier DCO; then multiplication by a 'prompt' linear combination of the two sub-carriers, by early or late reference signal from the sub-carrier DCO$_2$, by early or late reference signal from the sub-carrier DCO$_1$, finally multiplication by a prompt, early or late reference signal from the C/A code generator. The resulting signal combinations are accumulated over the code period and eight correlation results formed. The extreme right of the diagram shows the interaction through a data bus to the microprocessor 10.

The input signal u(t) at 5 can be described (neglecting additive noise and other (M)BOC signals simultaneously present) as $$u(t)=A\times\cos(\omega_0 t+\phi)\times(\sqrt{x_1}s_1(t-\tau)+\sqrt{x_2}s_2(t-\tau))\times a(t-\tau)\times d \quad (1)$$

where A is amplitude, $\cos(\omega_0 t+\phi)$ represents the carrier signal after down conversion to an intermediate frequency (IF) $\omega_0$ with phase $\phi$, $s_1(t-\tau)$ and $s_2(t-\tau)$ are the sub-carrier modulations in the received signal at delay $\tau$, $x_1$ and $x_2$ describe the relative apportionment of power, $a(t-\tau)$ is the code modulation in the received signal at delay $\tau$ and d is a polarity with $d\in(-1,+1)$. Here $s_1(\ )$ is the BOC(1,1) component while $s_2(\ )$ is the BOC(6,1) component.

The invention depends on the fact that sub-carrier$_1$ is half-periodic over a relatively short sub-chip width $T_{S1}$, and sub-carrier$_2$ which is half periodic over an even shorter time of a sub-chip width $T_{S2}$ and that expression (1) is mathematically identical to $$u(t)=A\times\cos(\omega_0 t+\phi)\times(\sqrt{x_1}s_1(t-\tau^*_1)+\sqrt{x_2}s_2(t-\tau^*_2))\times a(t-\tau)\times d^* \quad (2)$$

where values $$\tau^*_1=\tau+n_1 T_{S1}$$

$$\tau^*_2=\tau+n_2 T_{S2} \quad (3)$$

are multi-valued shifted offset delays depending on an arbitrary integer multiple $n_1$ of the sub-chip width $T_{S1}$ and integer multiple $n_2$ of the sub-chip width $T_{S2}$. It is necessary to note a restriction on the integers. Comparing (1) with (2) it is evident that if $n_1$ is an odd number then $n_2$ must be an odd number; or if $n_1$ is an even number then $n_2$ must be an even number, otherwise the correct shape of the composite modulation is not preserved.

Irrespective of these offset delays it should be understood that the actual sub-carrier delay and the code delay for any actually received signal are still the same as in (1). The receiver must always estimate this actual non-ambiguous delay $\tau$ in the code function a( ). It is however only necessary for the same receiver to seek to estimate the ambiguous and offsets $\tau^*_1$ and $\tau^*_2$ in the sub-carrier functions $s_1(\ )$ and $s_2(\ )$ respectively and still maintain signal to noise optimality. This result is entirely different from present art implementations of BOC/MBOC where these ambiguities must be prevented, and correlations need to be reset if they occur. Therefore the offset delays $\tau^*_1$ and $\tau^*_2$ relative to the true delay $\tau$ can be treated as if they were independent quantities as in (2), without regard to (1), and three independent estimates are thereby generated. Only in a final correction stage is it admitted that all three estimates of the true delay $\tau$ are related, and their values arithmetically combined according to a vernier principle (see from eqs. 35).

Referring to FIG. 8, the correlator stage 9 of the triple estimator 8 receives the digital signal u(t) from the ADC 5 and the clock signal c(t) from the reference oscillator 7. A carrier Digital Controlled Oscillator (DCO) 12 of the correlator stage uses the clock signal c(t) to generate In-phase (I) and Quadrature (Q) reference signals $r_I(t)$, $r_Q(t)$ at the IF $\omega_0$ with trial phase $\hat{\phi}$, e.g.

$$r_I(t)=+\cos(\omega_0 t+\hat{\phi}) \quad (4)$$

and $$r_Q(t)=\sin(\omega_0 t+\hat{\phi}) \quad (5)$$

The multiplier 13 then multiplies the digital signal u(t) with reference $r_I(t)$ and the I signal filter 14 filters the result to output an in-phase signal $v_I(t)$ in the I channel; while the Q signal multiplier 15 multiplies the digital signal u(t) with reference $r_Q(t)$ and the Q signal filter 16 filters the result to output quadrature signal $v_Q(t)$ in the Q channel. The I and Q signals can be described (neglecting additive noise and other (M)BOC signals simultaneously present) as $$v_I(t)=\cos(\phi-\hat{\phi})\times(A_1\times s_1(t-\tau^*_1)+A_2\times s_2(\tau^*_2))\times a(t-\tau)\times d \quad (6)$$

$$v_Q(t)=\sin(\phi-\hat{\phi})\times(A_1\times s_1(t-\tau^*_1)+A_2\times s_2(t-\tau^*_2))\times a(t-\tau)\times d \quad (7)$$

where identity is made that $$A_1=\sqrt{x_1}\times A$$

$$A_2=\sqrt{x_2}\times A \quad (8)$$

To simplify the maths instead of (6) and (7) one can write $$v_I(t)=A\times\cos(\phi-\hat{\phi})\times s(t,\tau^*_1,\tau^*_2)\times a(t-\tau)\times d \quad (9)$$

$$v_Q(t)=A\times\sin(\phi-\hat{\phi})\times s(t,\tau^*_1,\tau^*_2)\times a(t-\tau)\times d \quad (10)$$

where the composite modulation is described $$s(t,\tau^*_1,\tau^*_2)=\sqrt{x_1}s_1(t-\tau^*_1)+\sqrt{x_2}s_2(t-\tau^*_2) \quad (11)$$

A lower frequency sub-carrier DCO $17_1$ uses the clock signal c(t) input at 7 and the sub-carrier modulation function $s_1(\ )$ to generate Prompt ($P_1$), Early ($E_1$) and Late ($L_1$) gate sub-carrier reference signals $s_1(t-\hat{\tau}^*_1)$, $s_1(t-\hat{\tau}^*_1+T_{D1}/2)$, and $s_1(t-\hat{\tau}^*_1-T_{D1}/2)$ respectively, where $\hat{\tau}^*_1$ is a trial sub-carrier delay and $T_{D1}$ is the total separation between $E_1$ and $L_1$ gates. The separation or gate width $T_{D1}$ can be selected freely in the range $T_{S2} \leq T_{D1} \leq T_{S1}$.

Similarly a higher frequency sub-carrier DCO $17_2$ uses the clock signal c(t) and the sub-carrier modulation function $s_2(\ )$ to generate Prompt ($P_2$), Early ($E_2$) and Late ($L_2$) gate sub-carrier reference signals $s_2(t-\hat{\tau}^*_2)$, $s_2(t-\hat{\tau}^*_2+T_{D2}/2)$, and $s_2(t-\hat{\tau}^*_2-T_{D2}/2)$ respectively, where $\hat{\tau}^*_2$ is a trial sub-carrier delay and $T_{D2}$ is the total separation between $E_2$ and $L_2$ gates. The separation or gate width $T_{D2}$ is conventionally fixed at $T_{D2}=T_{S2}$, although if the transmitted bandwidth can support it, lower values will give improved accuracy.

Similarly, a code DCO 18 uses the clock signal c(t) and the code modulation function a(t) to generate P, E and L gate code reference signal $a(t-\hat{\tau})$, $a(t-\hat{\tau}+T_{DC}/2)$, $a(t-\hat{\tau}-T_{DC}/2)$ respectively, where $\hat{\tau}$ is a trial code delay and $T_{DC}$ is the total separation between E and L gates. The separation $T_{DC}$ can be selected freely in the range $T_{S1} \leq T_{DC} \leq T_C$.

The overall correlator stage 8 multiplies the I and Q signals $v_I(t)$, $v_Q(t)$ by appropriate combinations of the P, E and L gate sub-carrier reference signals $s_1(t-\hat{\tau}^*_1)$, $s_1(t-\hat{\tau}_1+T_{D1}/2)$, and $s_1(t-\hat{\tau}^*_1-T_{D1}/2)$, the P, E and L gate sub-carrier reference signals $s_2(t-\hat{\tau}^*_1)$, $s_2(t-\hat{\tau}^*_2+T_{D2}/2)$, and $s_2(t-\hat{\tau}^*_2-T_{D2}/2)$ along with the P, E and L gate code reference signals $a(t-\hat{\tau})$, $a(t-\hat{\tau}+T_{DC}/2)$, $a(t-\hat{\tau}-T_{DC}/2)$. Eight demodulated signals are generated: I channel sum sub carrier P gate code P gate signal $v_{III}(t)$; I channel sub carrier$_1$ $E_1$ gate code P gate signal $v_{IE1I}(t)$; I channel sub carrier$_1$ $L_1$ gate code P gate signal $v_{IL1I}(t)$, I channel sub carrier$_2$ $E_2$ gate code P gate signal $v_{IE2I}(t)$, I channel sub carrier$_2$ $L_2$ gate code P gate signal $v_{IL2I}(t)$; I channel sum sub carrier P gate code E gate signal $v_{IIE}(t)$; I channel sum sub carrier P gate code L gate signal $v_{IIL}(t)$; Q channel sum sub carrier P gate code P gate signal $v_{QII}(t)$. Algebraically $$v_{III}(t)=v_I(t)\times s(t,\hat{\tau}^*_1,\hat{\tau}^*_2)\times a(t-\hat{\tau}) \quad (12)$$

$$v_{IE1I}(t)=v_I(t)\times s_1(t-\hat{\tau}^*_1+T_{D1/2})\times a(t-\hat{\tau}) \quad (13)$$

$$v_{IL1I}(t)=v_I(t)\times s_1(t-\hat{\tau}^*_1+T_{D1/2})\times a(t-\hat{\tau}) \quad (14)$$

$$v_{IE2I}(t)=v_I(t)\times s_2(t-\hat{\tau}^*_2+T_{D2/2})\times a(t-\hat{\tau}) \quad (15)$$

$$v_{IL2I}(t)=v_I(t)\times s_2(t-\hat{\tau}^*_2+T_{D2/2})\times a(t-\hat{\tau}) \quad (16)$$

$$v_{IIE}(t)=v_I(t)\times s(t,\hat{\tau}^*_1,\hat{\tau}^*_2)\times a(t-\hat{\tau}+T_{DC/2}) \quad (17)$$

$$v_{IIL}(t)=v_I(t)\times s(t,\hat{\tau}^*_1,\hat{\tau}^*_2)\times a(t-\hat{\tau}-T_{DC/2}) \quad (18)$$

$$v_{QII}(t)=v_Q(t)\times s(t,\hat{\tau}^*_1,\hat{\tau}^*_2)\times a(t-\hat{\tau}) \quad (19)$$

where the composite trial modulation above $$s(t,\hat{\tau}^*_1,\hat{\tau}^*_2)=\sqrt{x_1}s_1(t-\hat{\tau}^*_1)+\sqrt{x_2}s_2(t-\hat{\tau}^*_2) \quad (20)$$

These multiplications are implemented by: first and second multipliers 19, 20 multiplying the I signal $v_I(t)$ with P gate sum sub-carrier $s(t,\hat{\tau}^*_1,\hat{\tau}^*_2)$ and P gate code to output demodulated, signal $v_{III}(t)$; third$_1$ and fourth$_1$ multipliers $21_1$, $22_1$ multiplying the I signal $v_I(t)$ with $E_1$ gate sub-carrier and P gate code to output second$_1$ demodulated signal $v_{IE1I}(t)$; fifth$_1$ and sixth$_1$ multipliers $23_1$, $24_1$ multiplying the I signal $v_I(t)$ with $L_1$ gate sub-carrier and P gate code to output third$_1$ demodulated signal $v_{IL1I}(t)$; third$_2$ and fourth$_2$ multipliers $21_2$, $22_2$ multiplying the I signal $v_I(t)$ with $E_2$ gate sub-carrier and P gate code to output second$_B$ demodulated signal $v_{IE2I}(t)$; fifth$_2$ and sixth$_2$ multipliers $23_2$, $24_2$ multiplying the I signal $v_I(t)$ with $L_2$ gate sub-carrier and P gate code to output third$_B$ demodulated signal $v_{IL2I}(t)$; first and seventh multipliers 19, 25 multiplying the I signal $v_I(t)$ with P gate composite sub-carrier and E gate code to output fourth demodulated signal $v_{IIE}(t)$; first and eighth multipliers 19, 26 multiplying the I signal $v_I(t)$ with P gate composite sub-carrier and L gate code to output fifth demodulated signal $v_{IIL}(t)$; and ninth and tenth multipliers 27, 28 for multiplying the Q signal $v_Q(t)$ with P gate composite sub-carrier and P gate code to output sixth demodulated signal $v_{QII}(t)$.

The demodulated signals $v_{III}(t)$, $v_{IE1I}(t)$, $v_{IL1I}(t)$, $v_{IE2I}(t)$, $v_{IL2I}(t)$, $v_{IIE}(t)$, $v_{IIL}(t)$ and $v_{QII}(t)$, are then integrated by integrators 29 to 34 respectively. The integrators 29 to 34 perform the integration over a fixed time, which in this embodiment is the same as the code period $T_G$. In other embodiments, the integration time can be an integer multiple of the code period $T_G$, so that the integration time is typically of the order of a few milliseconds in total.

The output of each of the integrators 29 to 34 is sampled by the processing stage 10 at the end of each fixed time and the integrators 29 to 34 reset to zero. The outputs of the integrators 29 to 34 can be described by a set of eight correlations $w_{III}[k]$, $w_{IE1I}[k]$, $w_{IL1I}[k]$, $w_{IE2I}[k]$, $w_{IL2I}[k]$, $w_{IIE}[k]$, $w_{IIL}[k]$ and $w_{QII}[k]$ for each sample k=1, 2, 3 . . . . The purpose of introducing this index k is to clarify the nature of a time series being generated—the actual practical software does not need to implement a count notation. The values of these correlations depend of the difference between the trial phase $\hat{\phi}$ and the true phase $\phi$ the difference between the trial sub-carrier delay $\hat{\tau}^*_1$ and the offset sub-carrier delay $\tau^*_1$, the difference between the trial sub-carrier delay $\hat{\tau}^*_2$ and the offset sub-carrier delay $\tau^*_2$, and the difference between the trial code delay $\hat{\tau}$ and the true code delay $\tau$. The I sub-carrier P gate and code P gate correlation $w_{III}[k]$ can be expressed exactly $$w_{III}[k]=A\times\cos(\phi-\hat{\phi})\times\chi(\hat{\tau}^*_1-\tau^*_1,\hat{\tau}^*_2-\tau^*_2,\hat{\tau}-\tau)\times d^* \quad (21)$$

where $\chi(\ldots)$ is a three-dimensional correlation function. This function is not easily displayed. The three-dimensional correlation function $\chi(\ldots)$ has multiple 'peaks' when the trial code delay $\hat{\tau}$ equals the true code delay $\tau$ i.e.

$$\hat{\tau}=\tau \quad (22)$$

and the trial sub-carrier delay $\hat{\tau}^*_1$ is equal to any of the multiple values of the sub-carrier code delay $\tau_1^*$, i.e. the true code delay $\tau$ plus a positive or negative integer n multiple of the sub-carrier symbol duration $T_{S1}$ i.e.

$$\hat{\tau}^*_1=\tau+n_1 T_{S1} \quad (23)$$

while the trial sub-carrier delay $\hat{\tau}^*_2$ is equal to any of the multiple values of the sub-carrier code delay $\tau^*_2$, i.e. the true code delay $\tau$ plus a positive or negative integer n multiple of twice the sub-carrier symbol duration $T_{S2}$ i.e.

$$\hat{\tau}_2^* = \tau + n_2 T_{S2} \quad (24)$$

The discriminator action meets the requirement that integer $n_2$ must be odd if $n_1$ is odd and even if $n_1$ is even. In consequence while the $\hat{\tau}^*_1$ estimate can shift by arbitrary integer multiple of $T_{S1}$ the $\hat{\tau}^*_2$ estimate will shift by integer multiples of $2T_{S2}$.

Figure 9:
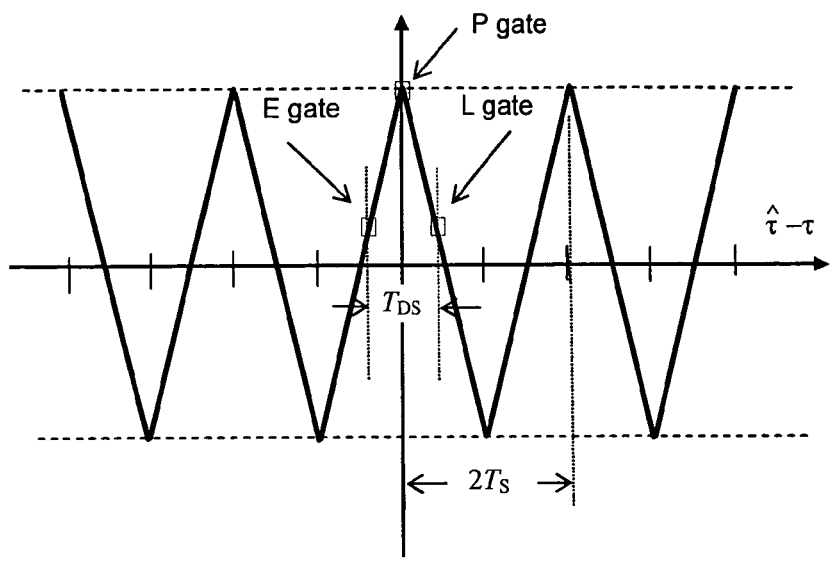
FIG. 9 shows the continuous triangular correlation in either of the sub-carrier component trial delay dimensions only.
Figure 10:
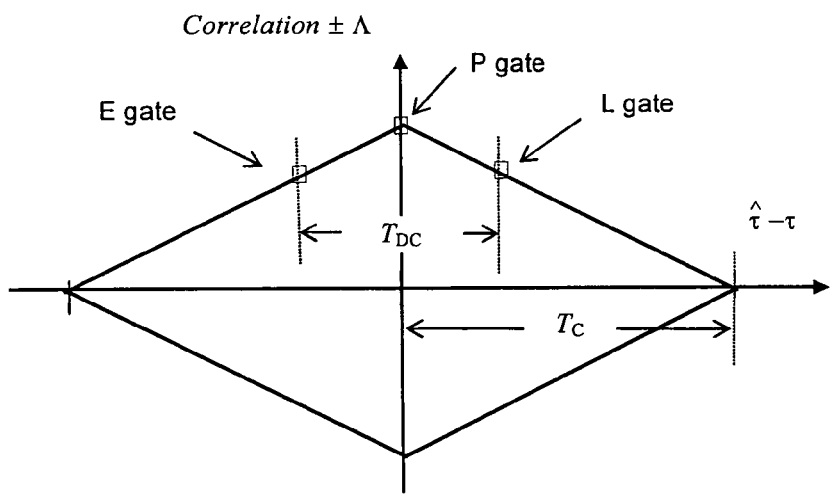
FIG. 10 is the nominal correlation in the code delay dimension only.

For explanatory purposes, the I sub-carrier P gate and code P gate correlation $w_{III}[k]$ can be approximated by the expression $$w_{III}[k] = A \times \cos(\phi - \hat{\phi}) \times (x_1 trc_1(\tau - \hat{\tau}^*_1) + x_2 trc_1(\tau - \hat{\tau}^*_2)) \times \Lambda(\hat{\tau} - \tau) \times d^* \quad (25)$$

where $trc_1(\ )$ is a continuous triangular cosine of periodicity $2T_{S1}$, $trc_2(\ )$ is a continuous triangular cosine of periodicity $2T_{S2}$. FIG. 9 sketches the general shape; while $\Lambda(\ldots)$ is the correlation function of a PSK modulated signal having the same code rate as the received signal. This is shown in FIG. 10

The other correlations $w_{IE1I}[k]$, $w_{IE1I}[k]$, $w_{IE2I}[k]$, $w_{IL2I}[k]$, $w_{IIE}[k]$, $w_{IIL}[k]$ and $w_{QII}[k]$ are likewise sufficiently well approximated mathematically by $$w_{IE1I}[k] \approx A_1 \times \cos(\phi - \hat{\phi}) \times trc_1(\hat{\tau}^*_1 - \tau_1^* - T_{D1}/2) \times \Lambda(\hat{\tau} - \tau) \times d^* \quad (26)$$

$$w_{IL1I}[k] \approx A_1 \times \cos(\phi - \hat{\phi}) \times trc_1(\hat{\tau}^*_1 - \tau_1^* - T_{D1}/2) \times \Lambda(\hat{\tau} - \tau) \times d^* \quad (27)$$

$$w_{IE2I}[k] \approx A_2 \times \cos(\phi - \hat{\phi}) \times trc_2(\hat{\tau}^*_2 - \tau_2^* - T_{D2}/2) \times \Lambda(\hat{\tau} - \tau) \times d^* \quad (28)$$

$$w_{IL2I}[k] \approx A_2 \times \cos(\phi - \hat{\phi}) \times trc_2(\hat{\tau}^*_2 - \tau_2^* - T_{D2}/2) \times \Lambda(\hat{\tau} - \tau) \times d^* \quad (29)$$

$$w_{IIE}[k] \approx A \times \cos(\phi - \hat{\phi}) \times x \times \Lambda(\hat{\tau} - \tau - T_{DC}/2) \times d^* \quad (30)$$

$$w_{IIL}[k] \approx A \times \cos(\phi - \hat{\phi}) \times s(\tau, \hat{\tau}^*_1, \hat{\tau}^*_2) \times \Lambda(\hat{\tau} - \tau + T_{DC}/2) \times d^* \quad (31)$$

$$w_{QII}[k] \approx A \times \sin(\phi - \hat{\phi}) \times s(\tau, \hat{\tau}^*_1, \hat{\tau}^*_2) \times \Lambda(\hat{\tau} - \tau) \times d^* \quad (32)$$

It can be appreciated that, when the I channel sub carrier$_1$ $E_1$ gate code P gate correlation $w_{IE1I}[k]$ has the same value as the I channel sub-carrier$_1$ $L_1$ gate of code P gate the correlation $w_{IL1I}[k]$, i.e. $w_{IE1I}[k] = w_{IL1I}[k]$, this because the $E_1$ and $L_1$ gates for the sub-carrier$_1$ reference signal have the same value.

Similarly, when the I channel sub carrier$_2$ $E_2$ gate code P gate correlation $w_{IE2I}[k]$ has the same value as the I channel sub carrier$_2$ $L_2$ gate code P gate correlation $w_{IL2I}[k]$ i.e. $w_{IE2I}[k] = w_{IL2I}[k]$ this is because the $E_2$ and $L_2$ gates for the sub-carrier$_2$ reference signals have the same value.

Similarly, when the I channel sum sub carrier P gate code E gate correlation $w_{IIE}[k]$ has the same value the I channel sum sub carrier P gate code L gate correlation $w_{IIL}[k]$, i.e. $w_{IIE}[k] = w_{IIL}[k]$, this because the E and L gates for the code have the same value.

Similarly when phase lock has been achieved the Q channel correlation $w_{QII}[k]$ is zero, i.e. $w_{QII}[k] = 0$, because the phase estimate $\hat{\phi}$ is the same as the true phase $\phi$ plus or minus an integer number of carrier half cycles, and the sine function in expression ( ) is zero.

Figure 11:
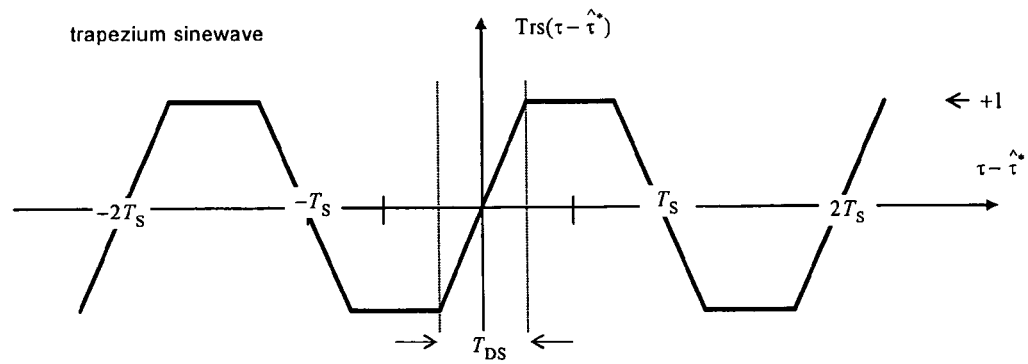
FIG. 11 is a CELP discriminator function in either of the component sub-carrier delay dimensions only.

Any difference between the correlation $w_{IE1I}[k]$ and the correlation $w_{IL1I}[k]$ is proportional to the difference between the sub-carrier trial delay $\hat{\tau}^*_1$ and the nearest multi-value of the sub-carrier delay $\tau^*_1$. Consequently, the processing stage 10 carries out a subtraction step $35_1$ that subtracts correlation $w_{IE1I}[k]$ from the correlation $w_{IL1I}[k]$ to give a sub-carrier$_1$ difference correlation $w_{IQ1I}[k]$. This can be expressed mathematically as $$w_{IQ1I}[k] \approx A_1 \times \cos(\phi - \hat{\phi}) \times Trs_1(\tau^*_1 - \hat{\tau}^*_1) \times trc_2(\hat{\tau}^*_2 - \tau^*_2) \times \Lambda(\hat{\tau} - \tau) \times d^* \quad (33\text{-}1)$$

where $Trs_1(\ )$ is a trapezium sine discriminator function of periodicity $2T_{S1}$ depending on the difference between the trial sub-carrier delay $\hat{\tau}^*_1$ and the multivalued sub-carrier delay $\tau^*_1$. FIG. 11 shows this general function.

Any difference between the correlation $w_{IE2I}[k]$ and the correlation $w_{IL2I}[k]$ is proportional to the difference between the sub-carrier trial delay $\hat{\tau}^*_2$ and the nearest multi-value of the sub-carrier delay $\tau^*_2$.

CELP

According to one embodiment the principle of coherent early-late processing (CELP) may be adopted. Consequently, the processing stage 10 carries out a subtraction step $35_2$ that subtracts correlation $w_{IE2I}[k]$ from the correlation $w_{IL2I}[k]$ to give a sub-carrier$_2$ difference correlation $w_{IQ2I}[k]$. This can be expressed as $$w_{IQ2I}[k] \approx A_1 \times \cos(\phi - \hat{\phi}) \times trc_1(\hat{\tau}^*_1 - \hat{\tau}^*_1) \times Trs_2(\hat{\tau}^*_2 - \tau^*_2) \times \Lambda(\hat{\tau} - \tau) \times d^* \quad (33\text{-}2)$$

where $Trs_2(\ )$ is a trapezium sine discriminator function of periodicity $2T_{S2}$ depending on the difference between the trial sub-carrier delay $\hat{\tau}^*_2$ and the multivalued sub-carrier delay $\tau^*_2$, again as shown in FIG. 11.

Figure 12:
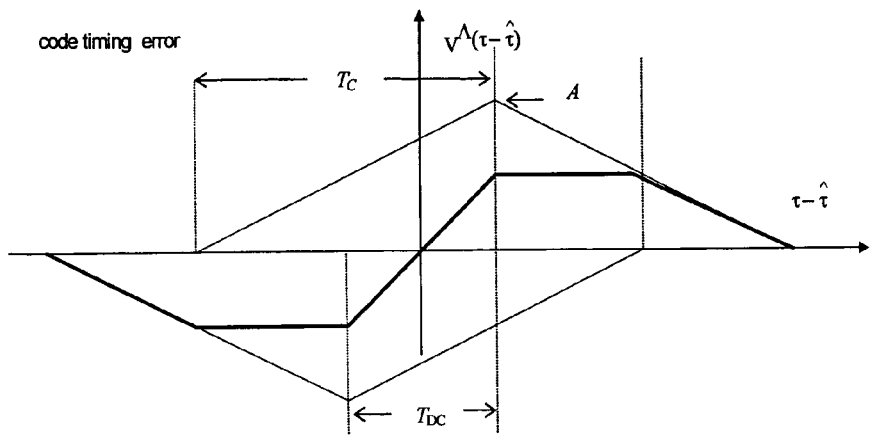
FIG. 12 is a CELP discriminator function in the code delay dimension only.

Similarly, any difference between the I sub-carrier P gate and I code E gate correlation $w_{IIE}[k]$, and the correlation $w_{IIL}[k]$ is proportional to the difference between the trial code delay $\tau$ and the true code delay $\tau$. Consequently, the processing stage 10 carries out a subtraction step 36 that subtracts correlation $w_{IIE}[k]$ from the correlation $w_{IIL}[k]$ to give a code difference correlation $w_{IIQ}[k]$. This can then be expressed as $$w_{IIQ}[k] A \times \cos(\phi - \hat{\phi}) \times (x_1 trc_1(\tau - \hat{\tau}^*_1) + x_2 trc_1(\tau - \hat{\tau}^*_2)) \times v^\Lambda (\hat{\tau} - \tau) \times d^* \quad (34)$$

where $V^\Lambda(\ )$ is a discriminator function and is shown in FIG. 12.

Finally, any non-zero value of the Q sub-carrier P gate and Q sub-carrier P gate correlation $w_{QII}[k]$ is approximately proportional to the difference between the trial phase $\hat{\phi}$ and the true phase $\phi$ within an arbitrary number of carrier half cycles.

It should be noted that in this account an E gate is subtracted from an L gate in order to ensure correct polarity of loop correction in terms of a code and sub-carrier delay estimate. In an equivalent description an L gate is subtracted from an E gate, in order to ensure correct polarity of loop correction as expressed in terms of a code and sub-carrier phase estimate. This is because conventionally 'phase' and 'delay' which are equivalent ways of describing shifts in periodic waveforms are generally perceived as having opposite signs.

Finally, any non-zero value of the Q sub-carrier P gate and Q sub-carrier P gate correlation $w_{QII}[k]$ is approximately proportional to the difference between the trial phase $\hat{\phi}$ and the true phase $\phi$.

NELP

An alternative embodiment according to the principle of non-coherent early late processing (NELP) may be adopted and is described below in 'alternative embodiments of error discriminators'

From the overall structure of the equations and with the quadruple loop action ideally in the absence of noise the carrier phase $\hat{\phi} \to \phi + n\pi$ where n is an odd or even integer, while the three time estimates $\hat{\tau}, \hat{\tau}^*_1$, and $\hat{\tau}^*_2$ converge ideally and independently to the values given as in (22), (23) and (24)

respectively. The $\hat{\tau}$ estimate is any unambiguous estimator of the true delay $\tau$ but can be shown to be the least accurate, in the presence of noise. The $\hat{\tau}^*_1$ is more accurate since it exploits the sub-carrier modulation but is offset by an arbitrary integer multiple $n_1$ of sub-chip width $T_{S1}$. A simplest procedure to derive a corrected estimate combines the two $$\hat{\tau}_1^+ = \hat{\tau}_1^* + \text{round}\left(\frac{\hat{\tau} - \hat{\tau}_1^*}{T_{S1}}\right) \times T_{S1} \quad (35\text{-}1)$$

This estimate corrected can then be used to correct the even better estimate based on the faster sub-carrier component $$\hat{\tau}_2^+ = \hat{\tau}_2^* + \text{round}\left(\frac{\hat{\tau}_1^+ - \hat{\tau}_2^*}{T_{S2}}\right) \times T_{S2} \quad (35\text{-}2)$$

finally, and recognising that the MBOC proposal puts considerably less power in the higher sub-carrier component, an optimal linear combination may be formed $$\hat{\tau}^+ = w_1 \hat{\tau}_1^+ + w_2 \hat{\tau}_2^+ \quad (35\text{-}3)$$

where coefficient $w_1$ and $w_2$ can be established from standard theory of least square estimation.

Rather than a double rounding procedure the preferred embodiment enables automatic integer correction within the loops operation so that $\hat{\tau}^*_1 \rightarrow \hat{\tau}_1^+$ and $\hat{\tau}^*_2 \rightarrow \hat{\tau}_2^+$ and there is no proliferation of different variable names Code Processing Description (CELP Implementation)

All processing actions will be described and also summarised in pseudo code. Execution of this block of computer code is synchronised to every correlation and is updated here according to a count k.

Correlations $w_{III}[k]$, $w_{IQ1I}[k]$, $w_{IQ2I}[k]$, $w_{IIQ}[k]$ and $w_{QII}[k]$ are input to this processing block. Timing errors $e_{\tau1*}[k]$, $e_{\tau2*}[k]$ and $e_{\tau}[k]$ and phase error $e_\phi[k]$ are generated from the correlations in order to steer the trial phase $\hat{\phi}[k]$, trial delays $\hat{\tau}^*_1[k]$, $\hat{\tau}^*_2[k]$ and $\hat{\tau}[k]$ towards true phase $\phi$ and true delays $\tau^*_1, \tau^*_2$ and $\tau$ respectively. Also responsive DLL gate widths $T_{DC}[k]$ and $SLL_1$ gate width $T_{D1}[k]$ are output—which vary in response to conditions. An optimal linear combination $\hat{\tau}^+$ of the SLL estimates is also computed.

The block of computer pseudo-code may be summarised as follows

| | | |
|---|---|---|
| $\rightarrow w_{III} w_{IQ1I} w_{IQ2I} w_{IIQ} w_{QII} \Delta\hat{\tau}_1 \Delta\hat{\tau}_2 \hat{\tau}_1^* \hat{\tau}_2^* \hat{\tau} \hat{\phi} T_{D1} T_{DC}$ | | |
| $\hat{d} \leftarrow \text{sgn}(w_{III})$ | compute sign | 36-1 |
| $e_\phi \leftarrow w_{QII} \times \hat{d}$ | PLL error | 36-2 |
| $e_{\tau1}^* \leftarrow w_{IQ1I} \times \hat{d}$ | $SLL_1$ error | 36-3$_1$ |
| $e_{\tau2}^* \leftarrow w_{IQ2I} \times \hat{d}$ | $SLL_2$ error | 36-3$_2$ |
| $e_\tau \leftarrow w_{IIQ} \times \hat{d}$ | DLL error | 36-4 |
| $f_\phi \leftarrow f_\phi + e_\phi$ | update phase estimate | 36-5 |
| $\hat{\phi} \leftarrow \hat{\phi} + k_1 f_\phi + k_2 e_\phi$ | | |
| $\hat{\tau}_2^* \leftarrow \hat{\tau}_2^* + k_{\tau2}^* e_{\tau2}^*$ | update $SLL_2$ estimate | 36-6$_2$ |
| $\hat{\tau}_1^* \leftarrow \hat{\tau}_1^* + k_{\tau1}^* e_{\tau1}^*$ | update $SLL_1$ estimate | 36-6$_1$ |
| $\hat{\tau} \leftarrow \hat{\tau} + k_\tau e_\tau$ | update DLL estimate | 36-7 |
| $\hat{\tau}^+ \leftarrow w_1 \hat{\tau}_1^* + w_2 \hat{\tau}_2^*$ | update optimal joint estimate | 36-8 |
| If $|\Delta\hat{\tau}_1| > T_{S1}/2$ | test tracking of $SLL_1$ against DLL | 36-9$_1$ |
| $\hat{\tau}_1^* \leftarrow \hat{\tau}_1^* + \text{sign}(\Delta\hat{\tau}_1) \times T_{S1}$ | boot $SLL_1$ estimate | 36-10$_1$ |
| $\Delta\hat{\tau}_1 \leftarrow 0$ | reset filter$_1$ output | 36-11$_1$ |
| $T_{DC} \leftarrow T_C$ | raise gate width DLL | 36-12$_1$ |
| otherwise | | |
| $\Delta\hat{\tau}_1 \leftarrow K_F \times (\hat{\tau} - \hat{\tau}_1^* - \Delta\hat{\tau}_1) + \Delta\hat{\tau}_1$ | filter estimate$_1$ difference | 36-13$_1$ |
| $T_{DC} \leftarrow K_D \times (T_{S1} - T_{DC}) + T_{DC}$ | relax gate width DLL | 36-14$_1$ |
| If $|\Delta\hat{\tau}_2| > T_{S2}/2$ | test tracking of $SLL_2$ against $SLL_1$ | 36-9$_2$ |
| $\hat{\tau}_2^* \leftarrow \hat{\tau}_2^* + \text{sign}(\Delta\hat{\tau}_2) \times T_{S2}$ | boot $SLL_2$ estimate | 36-10$_2$ |
| $\Delta\hat{\tau}_2 \leftarrow 0$ | reset filter$_2$ output | 36-11$_2$ |
| $T_{D1} \leftarrow T_{S1}$ | raise gate width of $SLL_1$ | 36-12$_2$ |
| otherwise | | |
| $\Delta\hat{\tau}_2 \leftarrow K_F \times (\hat{\tau}_1^* - \hat{\tau}_2^* - \Delta\hat{\tau}_2) + \Delta\hat{\tau}_2$ | filter estimate$_2$ difference | 36-13$_2$ |
| $T_{D1} \leftarrow K_D \times (T_{S2} - T_{D1}) + T_{D1}$ | relax gate width $SLL_1$ | 36-14$_2$ |
| $\leftarrow \Delta\hat{\tau}_1 \Delta\hat{\tau}_2 \hat{\tau}^+ \hat{\tau}_1^* \hat{\tau}_2^* \hat{\tau} \hat{\phi} T_{D1} T_{DC}$ | | |

DETAILED DESCRIPTION

The processing stage 1 is a limiter to estimate the sign of the I sub-carrier P gate and code P gate correlation $w_{III}[k]$ (which may be either positive or negative). The 'sgn' function delivers either +1 or −1 depending on the polarity of the correlation.

Every Ts, notated here as an event by a unit increment in count k, the processing stage 10 then computes the three feed-back error signals $e_\phi[k]$ $e_{\tau1*}[k]$ $e_{\tau2*}[k]$ $e_\tau[k]$ at 2, 3$_1$ 3$_2$, and 4 respectively by multiplying the respective Q sub-carrier P gate and Q code P gate correlation $w_{QII}[k]$, sub-carrier difference correlations $w_{IQ1I}[k]$ and $w_{IQ2I}[k]$ and code difference correlation $w_{IIQ}[k]$ by the sgn( ) signal $\hat{d}[k]$.

The count notation '[k]' is deliberately omitted since in the actual algorithm this count need not be recorded.

The processing stage then filters the error signals in order to increment or decrement the trial phase $\hat{\phi}$, sub-carrier trial delays $\hat{\tau}^*_1$ $\hat{\tau}^*_2$ and code trial delay $\hat{\tau}$ as in 5, 6$_1$, 6$_2$ and 7 respectively.

Of the three timing estimates, $\hat{\tau}^*_2$ with which $SLL_2$ tracks the sub carrier component at $f_2=6$ MHz is the most accurate but potentially ambiguous by multiples of $T_{S2}=1/12$ μs, while $\hat{\tau}^*_1$ with which $SLL_1$ tracks the sub carrier component at $f_2=1$ MHz is the less accurate but potentially ambiguous by multiples of $T_{S1}=1/2$ μs, and $\hat{\tau}$ with which DLL tracks the code component is the least accurate but quite unambiguous.

But because of the lower power in the MBOC component the difference in accuracy between the $SLL_1$ and $SLL_2$ estimates is not so large. Consequently it is worth while to form an optimal linear mix of the two estimates, after the values have been corrected, as is shown in line 8 to get an estimate which is the best of all.

Again, the count notation '[k]' is deliberately omitted since in the actual algorithm this count need not be recorded.

In this embodiment the carrier phase correction is implemented by a second order loop, where phase error $e_\phi$, increments an integrated phase error $f_\phi$, which direct and integrated errors update a current phase estimate via two gain constants $k_1$ and $k_2$. The SLL time estimates implement a first order loops via a gain constants $k_{\tau1*}$ and $k_{\tau2*}$ respectively and the DLL time estimate implements a first order loop via a gain constant $k_\tau$.

With increasing count and in the realistic presence of noise these errors go to zero on average i.e. $e_\phi[k] \rightarrow 0$, $e_\tau[k] \rightarrow 0$ and $e_{\tau1*}[k] \rightarrow 0$ $e_{\tau2*}[k] \rightarrow 0$ The remainder of the processing block is concerned with corrections when needed to the potentially ambiguous estimates.

In line 9$_1$ the filtered difference $\Delta\hat{\tau}_1$ between $SLL_1$ estimate $\hat{\tau}^*_1[k]$ and the DLL estimate $\hat{\tau}[k]$ was evaluated on previous iteration (previous k value).

If the difference $\Delta\hat{\tau}_1$ is now found to have exceeded half a sub-chip width $T_{S1}$ then the $SLL_1$ estimate is deemed to have slipped. This estimate is therefore booted, i.e. appropriately incremented or decremented as in $10_1$ and the difference $\Delta\hat{\tau}_1$ reset to zero at $11_1$. Further, the DLL gate width is expanded from whatever is its current narrower width ($T_{DC}$) to a full chip width $T_C$ as in $12_1$. The purpose of this manoeuvre is to speed up acquisition because it is likely that the DLL is in the process of acquiring lock.

Otherwise it may be that the filtered difference between the two estimates has not exceeded half a sub-chip width. In which case a first order difference filter updates $\Delta\hat{\tau}_1$ using the newly available updates $\hat{\tau}^*_1$ and $\hat{\tau}$ as in $13_1$. A gain term $K_F$ controls the response time of this difference filter. Further, the code gate width $T_{DC}$ decrements exponentially, and in due course, over sufficient number of iterations this width will settle asymptotically on a minimum value—made here to be equal to the sub-chip width $T_{S1}$ as in $14_1$. The settling time of this is determined by a controller gain $K_D$.

The point of controlling the DLL gate downwards to this minimum is in order to minimise the noise in the DLL loop, which if excessive could trigger a false decision in line $9_1$. In this way the operating range of the receiver is extended downwards to the lowest possible carrier to noise density ratio $C/N_0$. for a given loop bandwidth $B_L$. In this embodiment the DLL gate width $T_{DC}[k]$ therefore becomes a dynamic variable over the range $T_{S1} \leq T_{DC} \leq T_C$.

Figure 1:
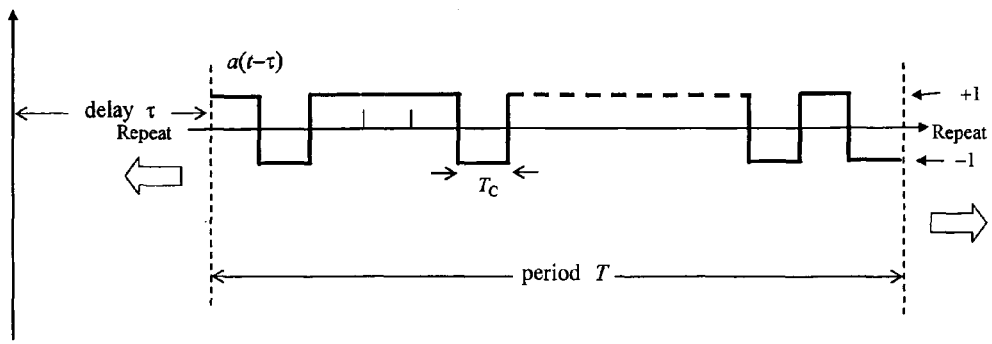
FIG. 1 is a graphical illustration of a PSK modulated signal according to the prior art.
Figure 2:
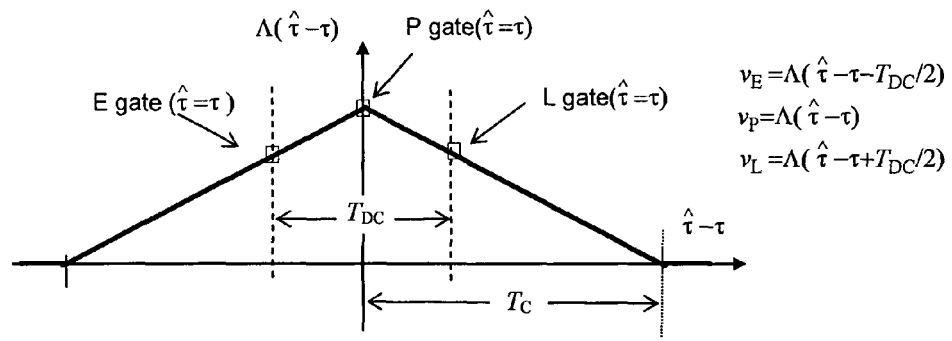
FIG. 2 is a graphical illustration of a correlation function for the PSK modulated signal shown in FIG. 1 according to the prior art.
Figure 3:
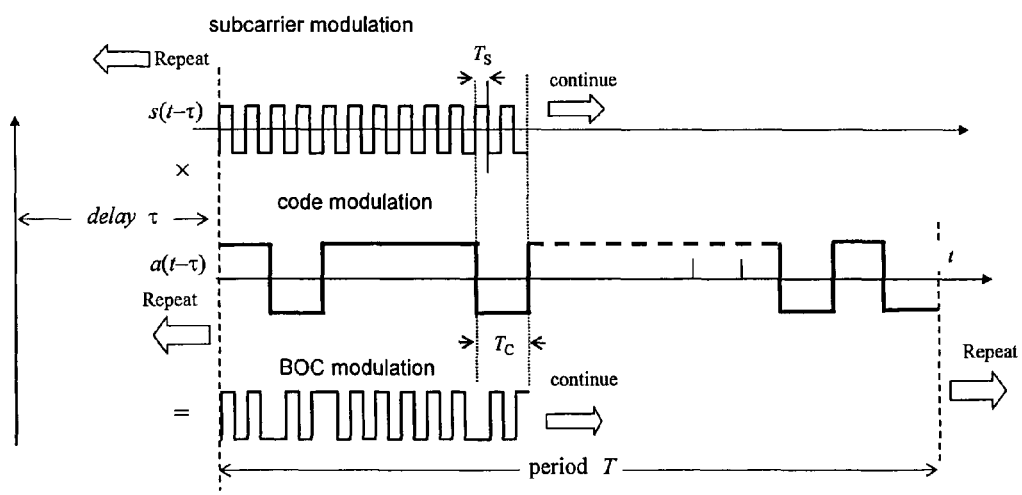
FIG. 3 is a graphical illustration of a basic sine-BOC modulated signal according to the prior art.
Figure 4A:
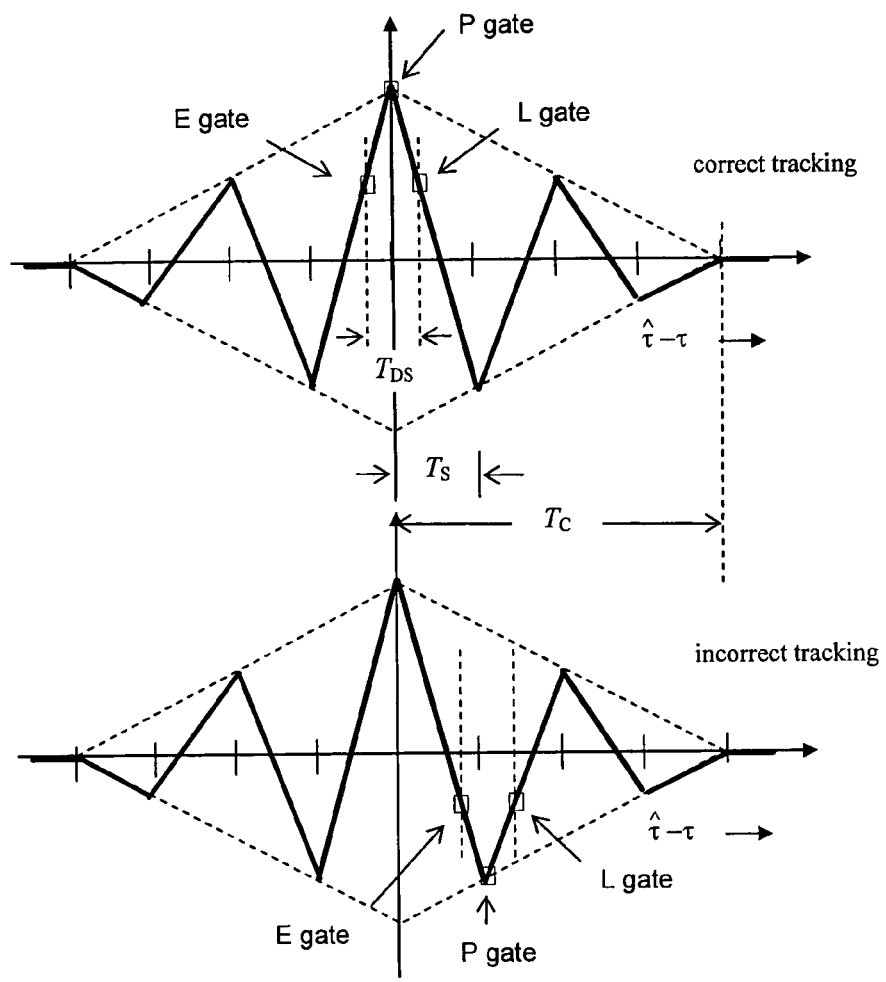
FIG. 4a is a graphical illustration of an ideal correlation function for the BOC modulated signal shown in FIG. 3 according to the prior art, showing examples of both correct tracking and false tracking.
Figure 4B:
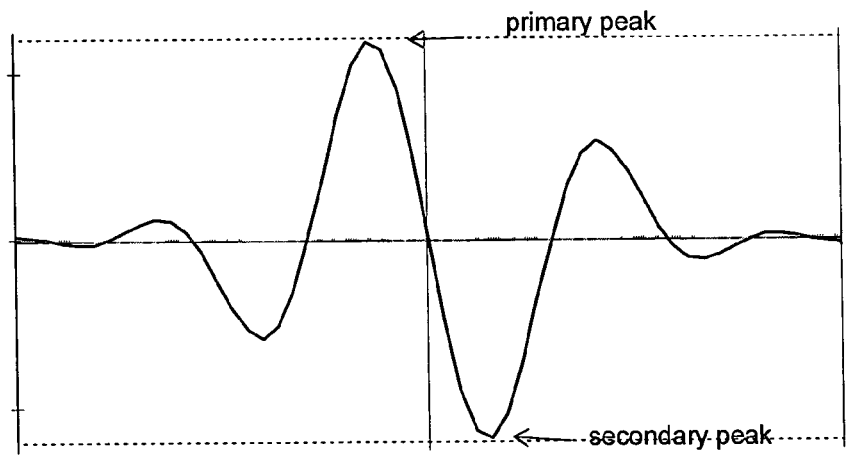
FIG. 4b is a graphical illustration of a correlation function for filtered and phase distorted correlation function for the BOC example of FIG. 3, showing deleterious effect on relative amplitudes of primary and nearest secondary peak.
Figure 5:
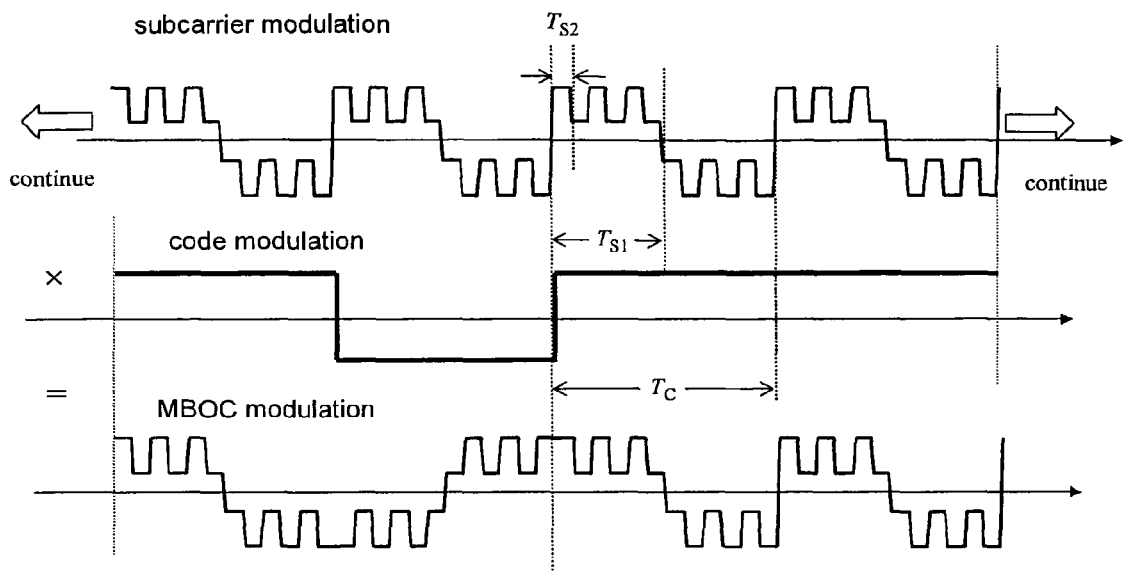
FIG. 5 is a graphical illustration of a basic sine-MBOC modulated signal according to the prior art.

A similar action takes place with respect to the filtered difference $\Delta\hat{\tau}_2$. The test for the $SLL_2$ estimate deemed to have slipped if it has exceeded a half sub-chip width $T_{S2}/2$—see line $9_2$. Alignment of the adjusted estimates preserves the correct shape of the multiplexed subcarriers as in FIG. 5 The reason is that in the Costas loop action respond only to the sign of estimate $\hat{d}[k]$ as determined by the state of $\hat{\phi}[k]$ $\hat{\tau}^*_1$ and $\hat{\tau}$. It will not respond to the value of $\hat{\tau}^*_2$ since in the two components of the sum modulation $s(t,\hat{\tau}^*_1, \hat{\tau}^*_2)$ the $s_1( )$ component is dominating. Consequently, while the time discriminator characteristic of error $e_{\tau 1*}$ is periodic over $T_{S1}$ the time discriminator characteristic of error $e_{\tau 2*}$ is periodic over $2T_{S2}$. In the event of a detected slip the $SLL_1$ gate width is augmented, anticipating an acquisition state. If no slip is detected this gate width is allowed to relax back to the steady state value.

If the difference $\Delta\hat{\tau}_2$ is now found to have exceeded a half sub-chip width $T_{S2}/2$ as at $9_2$ then the $SLL_2$ estimate is deemed to have slipped. This is therefore booted, i.e. appropriately incremented or decremented and the difference $\Delta\hat{\tau}_e$ is reset to zero in $10_2$ and $11_2$. Further, the $SLL_1$ gate width is expanded from whatever is its current narrower width ($T_{D1}$) to a full sub-chip width $T_{S1}$ in $12_2$. The purpose of this manoeuvre is to speed up acquisition because it is likely that the $SLL_1$ is in the process of acquiring lock.

Otherwise it may be that the filtered difference between the two estimates has not exceeded a full sub-chip width. In which case a first order difference filter updates $\Delta\hat{\tau}_2$ using the newly available updates $\hat{\tau}^*_1$ and $\hat{\tau}^*_2$ as in $13_2$. A gain term $K_F$ controls the response time of this difference filter. Further, the gate width $T_{D1}$ decrements exponentially, and in due course, over sufficient number of iterations this width will settle asymptotically on a minimum value—made here to be equal to the sub-chip width $T_{S2}$. The settling time of this is determined by a controller gain $K_D$.

The point of controlling the $SLL_1$ gate downwards to some minimum is in order to minimise the noise in the $SLL_1$ loop, which if excessive could trigger a false decision at $9_2$. In this way the receiver may operate in the lowest possible carrier to noise density ratio $C/N_0$. for a given loop bandwidth $B_L$.

In these correction stages it is admitted that the estimates $\hat{\tau}^*_1[k]$ $\hat{\tau}^*_2[k]$ and $\hat{\tau}[k]$ are necessarily linked, because the difference between them, after rounding, should be an integer multiple of the sub chip width $T_{S1}$ and an integer multiple of the sub chip width $T_{S2}$, respectively, and assuming that all three loops are locked (converged) and the input $C/N_0$ is sufficiently high. This best combination of the three estimates which finally yield an optimal linear combination $\hat{\tau}^+[k]$ is updated every correlation interval.

The system as described above with reference to FIGS. 7-12 eliminates the possibility of slip or false node tracking in an MBOC receiver while fully exploiting the potential of MBOC modulation.

As an essential qualification is noted that the system fails if the loops lose lock. But this is true of all loop-based systems. The system also fails if the filtered difference of estimates falls randomly outside the bounds $$|\Delta\hat{\tau}_1| > T_{S1}/2 \qquad (37)$$

$$|\Delta\hat{\tau}_2| > T_{S2}/2 \qquad (38)$$

which in principle can occur because of excessive noise in the various estimates, even if the loops are in lock, for too low an input carrier to noise density ratio (CNDR) and/or too high a loop bandwidth $B_L$. Theory finds however that this restriction on the allowed range of CNDR and $B_L$. is not practically onerous. The value of the DLL gate width $T_{DC}$, which controls the DLL discriminator action is an automatic compromise. To maximise speed of acquisition it is switched to the highest value which is the chip width $T_C$. This gives the fastest response of the DLL in the initial acquisition. In a detected steady state the relaxation of $T_{DC}$ down to sub-chip width $T_{S1}$ will however minimise the noise in the DLL estimate and extend the basic performance envelope. Similarly the value of the $SLL_1$ gate width $T_{D1}$, which controls the $SLL_1$ discriminator action is an automatic compromise. To maximize speed of acquisition it is switched to the highest value which is the sub-chip width $T_{S1}$. This gives the fastest response of the $SLL_1$ in the initial acquisition. In a detected steady state the relaxation of $T_{D1}$ down to the smaller sub-chip width $T_{S2}$ will however minimise the noise in the SLL1 estimate and extend the basic performance envelope.

The failure condition are however fail safe since the receiver can always measure for itself when this condition has arisen.

Allowing for Phase Distortion

Figure 6A:
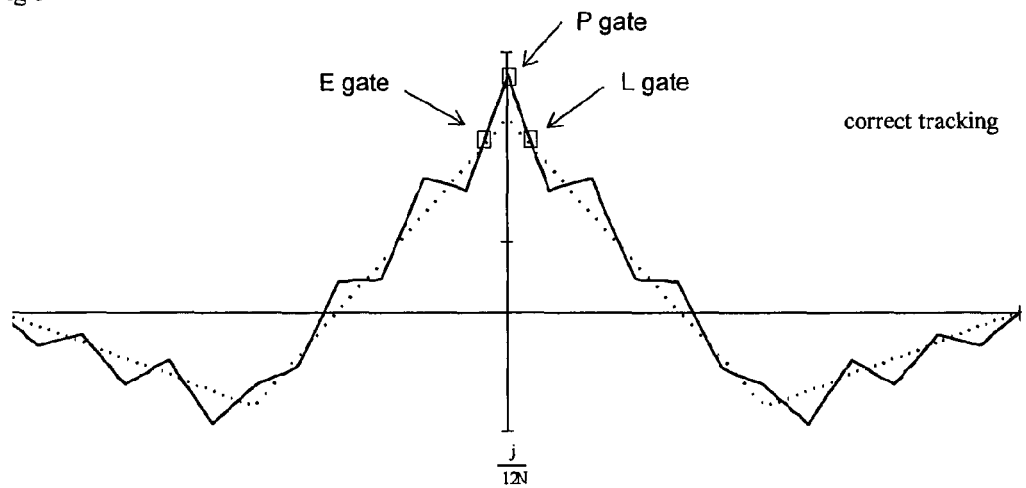
FIG. 6a is a graphical illustration of a correlation function for the MBOC modulated signal shown in FIG. 5 according to the prior art, showing examples of correct tracking.
Figure 6B:
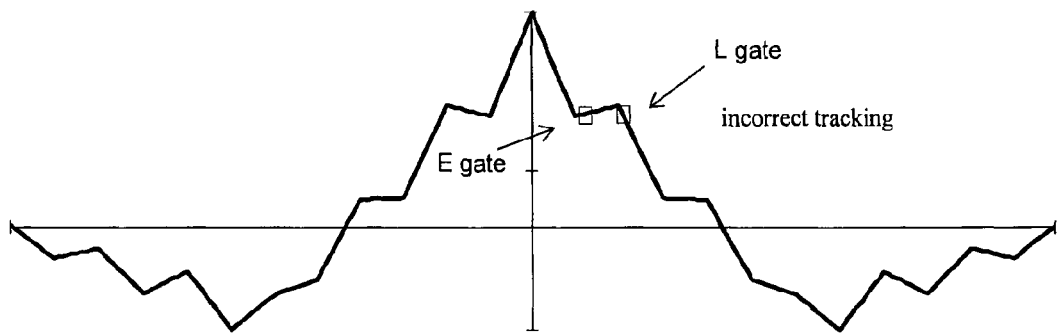
FIG. 6b is a graphical illustration of a correlation function for the MBOC modulated signal shown in FIG. 5 according to the prior art, showing examples of false tracking.
Figure 6C:
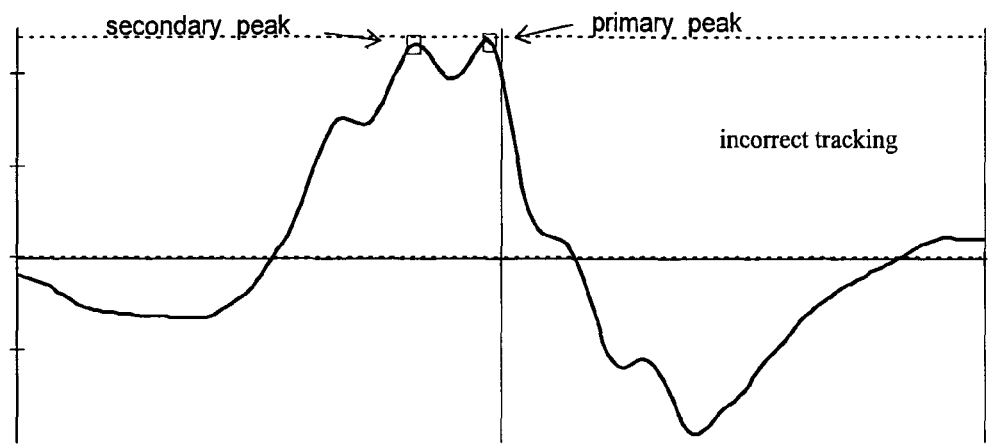
FIG. 6c is a graphical illustration of a correlation function for filtered and phase distorted correlation function for the MBOC example of FIG. 5, showing deleterious effect on relative amplitudes of primary and nearest secondary peak.

It was claimed that the prior art receiver designed according to the VEVL, amongst other problems, is vulnerable to phase distortion (see FIG. 6c). The same effect manifests itself here as non integer shifts to the two SLL estimates. Now (2) is literally true and instead of (3) one must write $$\tau^*_1 = \tau + n_1 T_{S1} + \epsilon_1$$

$$\tau^*_2 = \tau + n_2 T_{S2} + \epsilon_2 \qquad 3^*$$

where non-integer errors $\epsilon_1$ and $\epsilon_2$ are due to group delay distortion. The corresponding modifications needed in the pseudo code can be done in a number of ways. The simplest is to modify 36-8 to $$\hat{\tau}^+ \leftarrow w_1 \times (\hat{\tau}^*_1 - \hat{\epsilon}_1) + w_2 \times (\hat{\tau}^*_2 - \hat{\epsilon}_1) \qquad 36\text{-}8^*$$

and modify $(36\text{-}13_1)$ and $(36\text{-}13_2)$ accordingly so that $$\Delta\hat{\tau}_1 \leftarrow K_F \times (\hat{\tau} - \hat{\tau}^*_1 + \hat{\epsilon}_1 - \Delta\hat{\tau}_1) + \Delta\hat{\tau}_1 \qquad 36\text{-}13^*_1$$

$$\Delta\hat{\tau}_2 \leftarrow K_F \times (\hat{\tau} - \hat{\epsilon}_1 - \hat{\tau}^*_2 + \hat{\epsilon}_2 - \Delta\hat{\tau}_2) + \Delta\hat{\tau}_2 \qquad 36\text{-}13^*_2$$

where corrections $\hat{\epsilon}_1$ and $\hat{\epsilon}_2$ are supplied most simply in a preliminary calibration.

Practical Implementation

The correlator architecture of a GNSS BOC receiver requires relatively few changes compared to a GNSS PSK receiver in order to implement the triple estimate in a quadruple loop technique. This process is equivalent in both hardware and software receivers.

Figure 16:
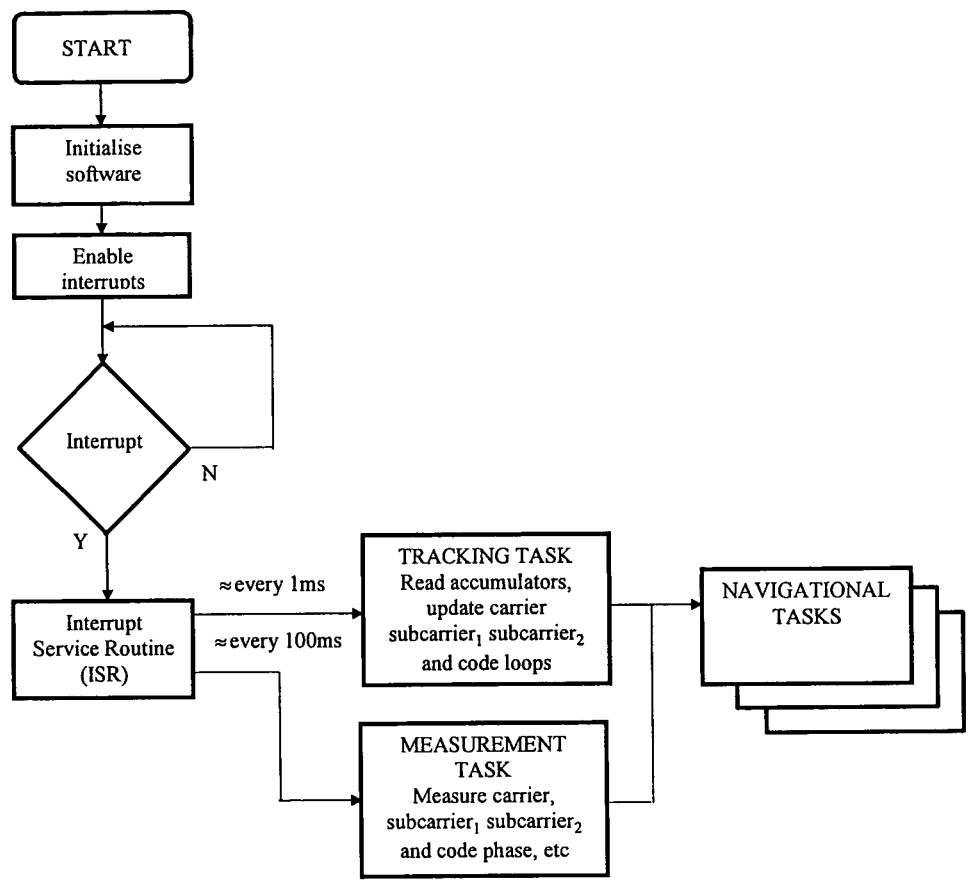
FIG. 16 shows an example of the top-level operations and tasks of a GNSS software receiver.

FIG. 16 shows an example of the top-level operations and tasks of a GNSS software receiver according to a further embodiment of the invention. The initialisation involves setting up the software and starting the correlator channels running. After initialisation the software enables the software interrupts. Typically two types of interrupt are used; a fast rate ($\approx$1 ms) interrupt for the tracking task which takes the highest priority and a slower rate ($\approx$100 ms) interrupt for the measurement task which is given a lower priority. The tracking task reads the accumulator values, estimates the navigational data state and updates all four loops with new estimates of carrier$_1$, sub carrier, sub carrier$_2$ and code phase. The measurement task provides the detailed measurements required to form the navigation solution such as reading the carrier, the two sub carriers and code DCO values and necessary counters in the correlator. Under these essential tasks priority can be given to the various navigational tasks.

Table T1 shows the hardware requirements of each correlator channel based on receiver architecture designed to operate at an intermediate frequency IF of 11.38 MHz, with a 50 MHz sampling rate, 100 ms measurement interval (TIC period) and 2-bit quantisation. The hardware requirements of the quadruple loop receiver as detailed in Table 1 are easily achievable (12 channels or more) with most modern ASIC and FPGA designs. Two levels of complexity are distinguished—the minimum components needed for the outer loop embodying a DLL—as given in the detailed description and FIG. 8 plus the detailed pseudo-code listing of Eqs (36). A further level of complexity requires the additional components as shown in extreme right columns for the purposes described in the next section.

TABLE 1

Hardware requirements of triple loop architecture per channel.

| Components | Size | Number required per channel basic | extended |
|---|---|---|---|
| Multipliers | 4 × 1 | 14 | +14 |
|  | 2 × 2 |  | 2 |
| Digitally Controlled Oscillators (DCO) | 31 bits (frequency resolution = 23.03 mHz) |  | 4 (Carrier, Sub carrier and Code DCOs) |
| Accumulators | 19 bits | 8 | +14 |
| Counters | 21 bits (carrier cycles in 100 ms) | 1 |  |
|  | 20 bits (sub carrier cycles up to 10.23 MHz) | 2 |  |
|  | 20 bits (code chips up to 10.23 Mcps) | 1 |  |
|  | 11 bits (epoch counter 1 ms epochs) | 1 |  |
| Registers | 31 bits (phase register) |  | 3 (Carrier, Sub carrier and Code DCO phase) |

Extensions and Improvements

In the standard literature numerous improvements and alternatives are described to enable double loop implementation of standard PSK-CDMA. Without exception, after appropriate modification these may be applied to the quadruple loop receiver of MBOC.

Additional Correlations

Not shown in FIG. 8 are potential improvements and alternatives, obtainable from computing further processing the down converted signals. These by natural extension for n=1 and n=2

$$v_{IEnE}(t)=v_I(t)\times s_n(t-\hat{\tau}^*+T_{Dn/2})\times a(t-\hat{\tau}+T_{DC/2}) \quad (39)$$

$$v_{ILnE}(t)=v_I(t)\times s_n(t-\hat{\tau}^*-T_{Dn/2})\times a(t-\hat{\tau}+T_{DC/2}) \quad (40)$$

$$v_{IEnL}(t)=v_I(t)\times s_n(t-\hat{\tau}^*+T_{Dn/2})\times a(t-\hat{\tau}+T_{DC/2}) \quad (41)$$

$$v_{ILnL}(t)=v_I(t)\times s_n(t-\hat{\tau}^*-T_{Dn/2})\times a(t-\hat{\tau}+T_{DC/2}) \quad (42)$$

$$v_{QEnI}(t)=v_Q(t)\times s_n(t-\hat{\tau}^*+T_{Dn/2})\times a(t-\hat{\tau}) \quad (43)$$

$$v_{QLnI}(t)=v_Q(t)\times s_n(t-\hat{\tau}^*-T_{Dn/2})\times a(t-\hat{\tau}) \quad (44)$$

$$v_{QIE}(t)=v_Q(t)\times s(t,\hat{\tau}^*_1,\hat{\tau}^*_2)\times a(t-\hat{\tau}+T_{DC/2}) \quad (45)$$

$$v_{QIL}(t)=v_Q(t)\times s(t,\hat{\tau}^*_1,\hat{\tau}^*_2)\times a(t-\hat{\tau}+T_{DC/2}) \quad (46)$$

where again the composite trial modulation above $$s(t,\hat{\tau}^*_1,\hat{\tau}^*_2)=\sqrt{x_1}s_1(t-\hat{\tau}^*_1)+\sqrt{x_2}s_2(t-\hat{\tau}^*_2) \quad (11)$$

From these may be integrated to corresponding correlations every T seconds to $w_{IEnE}[k]$, $w_{ILnE}[k]$, $w_{IEnL}[k]$, $w_{ILnL}[k]$, $w_{QEnI}[k]$, $w_{QLnI}[k]$, $w_{QIE}[k]$, $w_{QIL}[k]$ respectively. Further, there may be extracted correlation differences $$w_{IQnQ}=(w_{ILnL}-w_{IEnL})-(w_{ILnE}-w_{IEnE}) \quad (47)$$

$$w_{QQnI}=w_{QLnI}-w_{QEnI} \quad (48)$$

$$w_{QIQ}=w_{QIL}-w_{QIE} \quad (49)$$

These correlations may be used to enhance and generalise operation of the invention in many different ways.

Improvement from Carrier Aiding

The invention admits the standard technique of carrier aiding—the technique of importing into the delay estimate a correction proportional to the Doppler frequency. The equations (36-6) can be modified accordingly to read $$\hat{\tau}^*_2 \leftarrow \hat{\tau}^*_2 + k_{\phi 2} f_\phi + k_{\tau 2} e_{\tau 2^*} \quad (50)$$

$$\hat{\tau}^*_1 \leftarrow \hat{\tau}^*_1 + k_{\phi 1} f_\phi + k_{\tau 1} e_{\tau 1^*} \quad (51)$$

$$\hat{\tau} \leftarrow \hat{\tau} + k_\phi f_\phi + k_\tau e_\tau \quad (52)$$

Term $f_\phi$ is the same as in the PLL equations (36-5) and is interpreted as a scaled Doppler shift estimate (either positive or negative depending on the sign of the relative motion). Constants $k_\phi$, $k_{\phi 2^*}$ and $k_{\phi 1^*}$ are pre-calculated to provide the necessary open loop correction of Doppler shift appropriately scaled down to the code rate and sub-carrier rate respectively.

Alternative Embodiments of Error Discriminators

The computation to error sequences according to (36-2), (36-3), and (36-4) utilised only one of many possible discriminators. The standard alternatives available in the dual-loop single-estimate conventional PSK receivers may be adopted here, after appropriate modification, and in particular non-coherent early late processors (NELP).

PLL Discriminators

From (36-1) and (36-2) the equivalent formulation is $$e_\phi \leftarrow w_{QII}[k]\times sgn(w_{III}) \quad (53)$$

Dispensing with sgn( ) operation gives $$e_\phi \leftarrow w_{QII}[k]\times w_{III} \quad (54)$$

Expressing this as a ratio gives $$e_\phi \leftarrow \frac{w_{QII}}{w_{III}} \quad (55)$$

To improve tracking when SLL is not yet in lock one can adopt $$e_\phi \leftarrow w_{QII} \times sgn(w_{III}) + w_{QQI} \times sgn(w_{IQI}) \quad (56)$$

from which removing sgn( ) gives $$e_\phi \leftarrow w_{QII} \times w_{III} + w_{QQI} \times w_{IQI} \quad (57)$$

SLL$_n$ Discriminators
From (36-1) and (36-3) the equivalent formulation is $$e_{\tau n^*} \leftarrow w_{IQnI} \times sgn(w_{III}) \quad (58)$$

Dispensing with the sgn( ) operation gives $$e_{\tau n^*} \leftarrow w_{IQnI} \times w_{III} \quad (59)$$

Expressing this as a ratio gives $$e_{\tau n^*} \leftarrow \frac{w_{IQnI}}{w_{III}} \quad (60)$$

DLL Discriminator
From (36-1) and (36-4) the equivalent formulation is $$e_\tau \leftarrow w_{IIQ} \times sgn(w_{III}) \quad (61)$$

Removing the sgn( ) operation gives $$e_\tau \leftarrow w_{IIQ} \times w_{III} \quad (62)$$

Incoherent DLL Embodiment

It has been claimed that an 'incoherent DLL' receiver is more effective than 'coherent DLL'. A representative paper is "Theory and Performance of narrow correlation spacing in a GPS receiver", A. J. Van Dierendonck et al ION National Technical Meeting San Diego Calif. January 1992. This concept requires a frequency locked loop (FLL) instead of a PLL in the outer loop. This type of system is readily incorporated into the triple estimate concept for MBOC-GNSS requiring however some of the additional correlations identified from (39) to (46).

The implementation of an FLL requires only that the difference between the phase and the phase estimate $$\Delta\phi = \phi - \hat{\phi} \quad (63)$$

be made to settle at some arbitrary constant rather than zero. The aim however with the control of the time estimates in the two loops is again that $\hat{\tau}^*_1 \to \tau + n_1 T_{S1}$, $\hat{\tau}^*_2 \to T + n_2 T_{s2}$ and $\hat{\tau} \to \tau$. But effective tracking of the SLL$_1$ sub carrier phase and SLL$_2$ (to yield estimates $\hat{\tau}^*_1$ and $\hat{\tau}^*_2$ respectively) and the DLL (to yield estimate $\hat{\tau}$) must generate an error signal which is indifferent to an arbitrary constant offset between $\hat{\phi}$ and $\phi$.

It is necessary then to realise a frequency discriminator from the correlations and/or correlation differences, and to ensure that the SLL$_1$, SLL$_2$ and DLL discriminators are indifferent to carrier phase error.

FLL Discriminators

First we can compute a frequency error from current and previous correlations and correlation differences $$e_{\omega QI} \leftarrow w_{QII} sgn(w_{III}^-) - w_{III} sgn(w_{QII}^-) \quad (64)$$

where the notation $w_{III}^-$ and $w_{QII}^-$ stands for correlation in the previous correlation (earlier by T) One can also form $$e_{\omega II} \leftarrow w_{III} sgn(w_{III}^-) + w_{QII} sgn(w_{QII}^-) \quad (65)$$

which allows a 2-quadrant computation $$e_\omega = \frac{\langle e_{\omega QI} \rangle}{\langle e_{\omega II} \rangle} \approx \tan(\Delta\omega) \quad (66)$$

Alternatively a 4 quadrant computation $$e_\omega = \arctan 2 \langle e_{\omega QI} \rangle, \langle e_{\omega II} \rangle \quad (67)$$

Another alternative is to dispense with sgn functions as in (64) so that $$e_{\omega QI} \leftarrow w_{QII} w_{III}^- - w_{III} w_{QII}^- \quad (68)$$

and one can also form $$e_{\omega II} \leftarrow w_{III} w_{III}^- + w_{QII} w_{QII}^- \quad (69)$$

which again allows a 2-quadrant computation or a 4 quadrant comparison.

SLL Discriminators (NELP)

The discriminator must work for an arbitrary phase difference $\Delta\phi$ Discriminator (36-3) does not work in this case, so we need to extend to $$e_{\tau n^*} \leftarrow w_{IQnI} sgn(w_{III}) + w_{QQnI} sgn(w_{QII}) \quad (70)$$

One can dispense with sgn( ) to obtain $$e_{\tau n^*} \leftarrow w_{IQnI} w_{III} + w_{QQnI} w_{QII} \quad (71)$$

DLL Discriminator (NELP)

The discriminator must work for an arbitrary phase difference $\Delta\phi$ Discriminator (36-4) does not work in this case, so we need to extend to $$e_\tau \leftarrow w_{IIQ} sgn(w_{III}) + w_{QIQ} sgn(w_{QII}) \quad (72)$$

One can dispense with sgn( ) to obtain $$e_\tau \leftarrow w_{IIQ} w_{III} + w_{QIQ} w_{QII} \quad (73)$$

Computing the difference of power direct from early and late correlations gives $$e_\tau \leftarrow w_{IIL}^2 + w_{QIL}^2 - w_{IIE}^2 - w_{QIE}^2 \quad (74)$$

which one may enhance with further correlations to obtain $$e_\tau \leftarrow (w_{IIL}^2 + w_{QIL}^2 + w_{IQL}^2 + w_{QQL}^2) - (w_{IIE}^2 + w_{QIE}^2 + w_{IQE}^2 + w_{QQE}^2) \quad (75)$$

Computing the difference of amplitude direct from early and late correlations gives $$e_\tau \leftarrow \sqrt{w_{IIL}^2 - w_{QIL}^2} - \sqrt{w_{IIE}^2 + w_{QIE}^2} \quad (76)$$

and computing the normalised difference gives $$e_\tau \leftarrow \frac{\sqrt{w_{IIL}^2 - w_{QIL}^2} - \sqrt{w_{IIE}^2 + w_{QIE}^2}}{\sqrt{w_{IIL}^2 - w_{QIL}^2} - \sqrt{w_{IIE}^2 + w_{QIE}^2}} \quad (77)$$

Loop Operations
An appropriate modification for 'incoherent DLL' can be expressed in pseudo code as:

$$\hat{e}_\phi \leftarrow \hat{e}_\phi + e_{\omega I}$$

$$\hat{f}_\phi \leftarrow \hat{f}_\phi + \hat{e}_\phi FLL \quad (78)$$

$$\hat{\phi} \leftarrow \hat{\phi} + k_1 \hat{f}_\phi + k_2 \hat{e}_\phi$$

$$\hat{\tau}^*_1 \leftarrow \hat{\tau}^*_1 + k_{\tau 1} * e_{\tau 1} * SLL_1 \quad (79)$$

$$\hat{\tau}^*_2 \leftarrow \hat{\tau}^*_2 + k_{\tau 2} * e_{\tau 2} * SLL_2 \quad (80)$$

$$\hat{\tau} \leftarrow \hat{\tau} + k_\tau e_\tau DLL \quad (81)$$

which can be extended by carrier aiding.

Computer Generated Simulation

Figure 13:
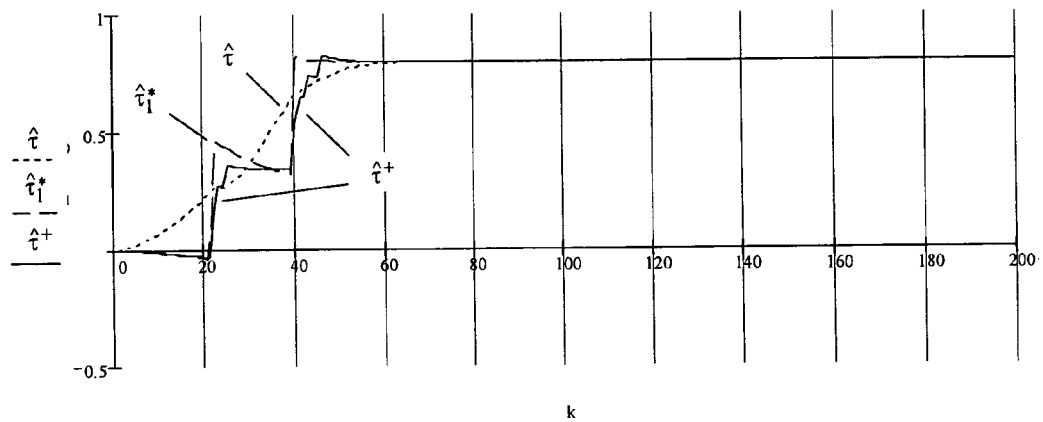
FIGS. 13, 14 and 15 are computer-generated syntheses illustrating operation of the MBOC receiver.
Figure 13:
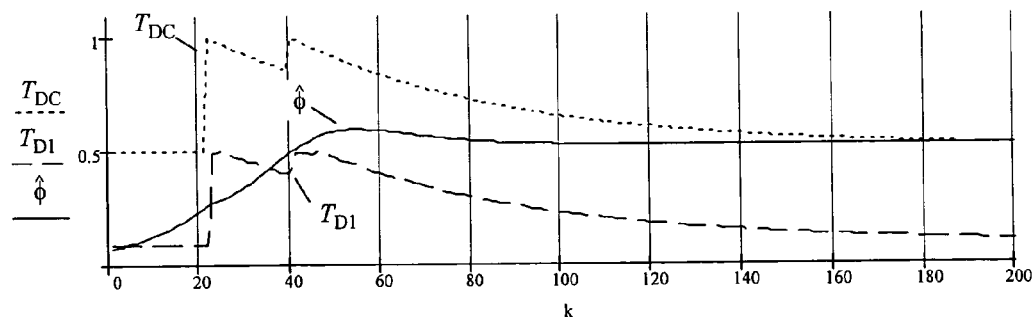
Figure 14:
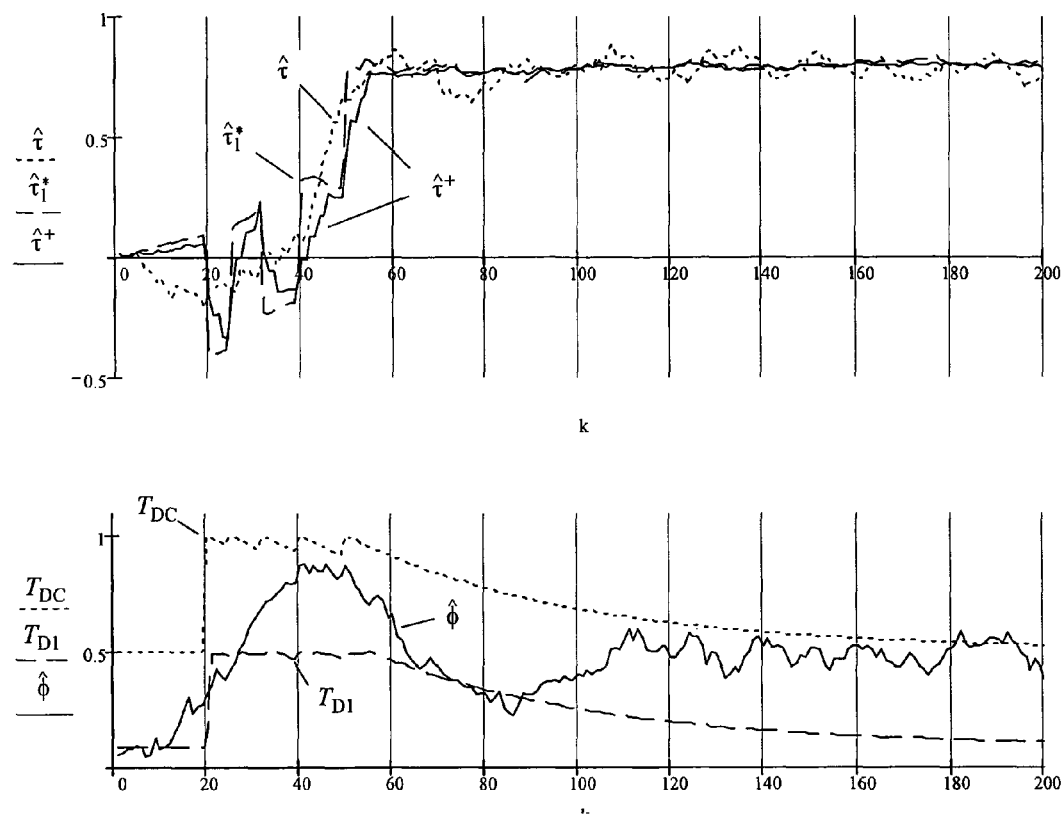
Figure 15:
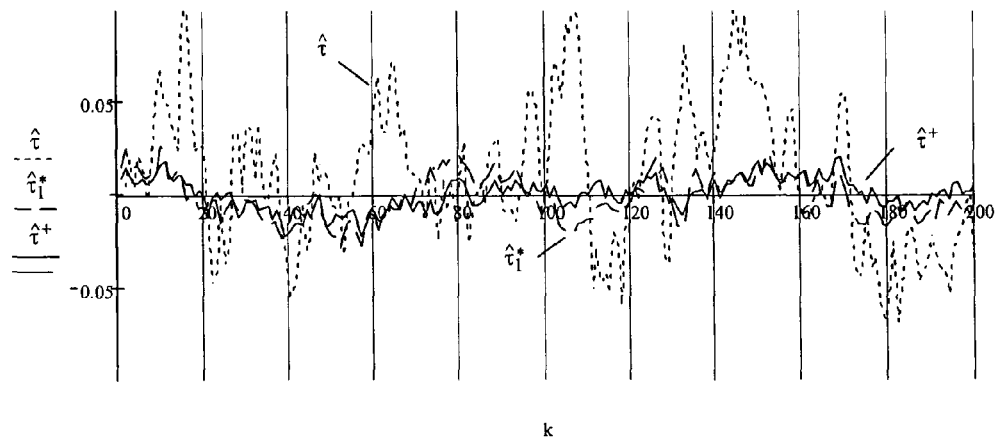

FIGS. 13, 14 and 15 show a simulation of the quadruple loop-dual estimator in action according to the embodiment of FIG. 8, and as described earlier, according to the CELP principle. The chosen parameters are exactly the same in the two FIGS. 13 and 14 but without and with additive noise respectively. The aim here is not only to demonstrate the anti-slip fail safe nature of the quadruple loop but also to show a typical acquisition process. There is assumed to have been an initial search—just as in standard PSK-CDMA—which brings the code delay estimate within $\pm T_C$ of the actual input delay and therefore within range of the DLL discriminator.

Simulation values are deliberately chosen for the most stringent test of possible operation. The $C/N_0 \pm 250$ Hz is equivalent to 24 dBHz and is the very low value chosen in the already cited paper by Fine and Wilson. This carrier to noise density ratio is significantly lower than usual test conditions for GNSS signals. The MBOC modulation is the one actually proposed where the high rate component BOC(6,1) is 2/11 of the low rate component BOC(1,1). This composite modulation confined to the pilot channel which is 50% of the whole power. Correlation interval T=20 ms gives 10 dB signal to I channel noise ratio Normalised chip width $T_C=1$. Normalised sub-chip width $T_{S1}=1/2$. Normalised sub-chip width $T_{S2}=1/12$. The loop bandwidth of $B_L=2$ Hz which is close to the highest allowed for this low value of $C/N_0$. The test here shows that the algorithm will simultaneously acquire all three estimates and instantaneously correct the $SLL_1$ estimate from the DLL estimate and the $SLL_2$ estimate from the $SLL_1$ estimate, even during the dynamic process when the loops are locking up. Tracking performance depends on the difference between the actual code delay and the initial setting of the loop estimates after an initial search. The example has a synthesised actual delay $\tau=\tau_0=9.5/12$ which is bad start up condition with the DLL and SLL loops originally initialised in this example with $\hat{\tau}^*_1=0, \hat{\tau}^*_2=0$ and $\hat{\tau}=0$, because the initial search result is presumed to be a poor one. Filter gains $K_F=0.5$ and $K_D=0.02$ were chosen empirically as a result of these tests.

The rising dotted curve in the upper graph is the DLL estimate. Acquisition by the DLL responds immediately but the other loops hardly move until count 21 (420 msec); then $SLL_1$ is booted into action and immediately after $SLL_2$. The long dashed curve for $SLL_1$ shows that it requires only two steps to get to the final estimate; while the continuous curve for $SLL_2$ shows the expected smaller increments.

The whole point and purpose of the invention is demonstrated here: namely when the loops are active (and the signal to noise is high enough) it is impossible for the higher-accuracy $SLL_2$ estimate to slip more than $\pm T_{S2}/2$ out of alignment with the lower accuracy $SLL_1$ estimate which in turn cannot slip more than $\pm T_{S1}/2$ with respect to the lowest accuracy DLL estimate. Acquisition is complete on a step at around 50 counts or 1 s. The simulation also monitors the tracking of the third carrier tracking loop which here is a $2^{nd}$ order PLL. An input true carrier phase of $\phi=30$ deg was adopted arbitrarily for this example. The continuous track on the lower graph of FIG. 13 is the phase estimate and shows the characteristic overshoot of a under-damped second order loop. The dotted and dashed curves on the lower graph show the dynamic response of the gate widths $T_{DC}$ and $T_{D1}$—opening out when there is a perceived need for rapid acquisition and then settling down to lower levels $T_{S1}$ and $T_{S2}$ respectively in due time.

Similar results with additive electrical noise actually present are shown in example from FIG. 14. The acquisition time is accordingly a random variable. It can take longer; or it can be shorter. The quasi-random nature of the acquisition process is evident. Yet there is a definite acquisition.

FIG. 15 shows the relative noise levels in steady measurements. The widely fluctuating dotted curve is the DLL estimate. The broken curve is the $SLL_1$ estimate. The continuous curve is the joint optimal linear estimate computed as described. The much lower timing error in the optimal estimate is evident.

The advantage of some embodiments of the present invention over the prior art may include the following: the method can realise the potential accuracy of MBOC Discounting loop settling time (common to all systems) the correct estimate is essentially instantaneous. The present invention avoids locking on a wrong peak (false node), provided uncritical requirements on input carrier to noise density ratio and loop bandwidth are met, since there is no multi-peaked one-dimensional correlation function in the first place. More specifically, while the DLL estimate $\hat{\tau}$ must converge on the true delay, the two SLL estimates $\hat{\tau}^*_1$ and $\hat{\tau}^*_2$ may converge on arbitrary offsets from this true delay and only instantaneous arithmetic corrections according to Eqs. 35 need be implemented, without loss of optimality. Equivalently the more complicated routines of Esq. 36 allows for arithmetic corrections without need for re-setting the corresponding correlations. The receiver is therefore fail safe, in the sense that after loop convergence the highest quality estimate is immediately and continuously available thereafter. This is a unique feature to the present invention It is also insensitive to non-linear amplitude/frequency conversion that may be present in the transmission chain.

The described embodiments of the invention are only examples of how the invention may be implemented. Modifications, variations and changes to the described embodiments will occur to those having appropriate skills and knowledge. These modifications, variations and changes may be made without departure from the scope of the invention defined in the claims and its equivalents.

The invention claimed is:

1. A receiver for receiving a navigation signal comprising a carrier modulated by a code modulation function of a given code rate and further modulated by a composite sub-carrier modulation function having first and second components with two different rates both of which are different to the code rate, the receiver comprising a processor arranged to:
   generate a first estimate of delay based on the code modulation only;
   generate a second estimate of delay based on the first component of the sub-carrier modulation only; and
   generate a third estimate of delay based on the second component of the sub-carrier modulation only; and
   determine a further delay estimate from the first, second and third delay estimates; and
   wherein the rate of the second component is higher than the rate of the first component and the processor is arranged in determining the further delay estimate, to recalculate the second estimate by an integer number of half cycles at the lower sub-carrier frequency to bring it towards the first estimate, and to recalculate the third estimate by an integer number of half cycles at the higher sub-carrier frequency to bring it towards the second estimate.

2. A receiver according to claim 1 wherein the processor is arranged to make a correction to at least one of the second and third estimates of delay to correct for phase distortion.

3. A receiver according to claim 2 wherein the correction is a non-integer multiple of the sub-chip width.

4. A receiver according to claim 1 wherein a control means is arranged to determine a combined estimate of delay from the third delay estimate and the further delay estimate.

5. A receiver for receiving a navigation signal comprising a carrier modulated by a code modulation function of a given code rate and further modulated by a composite sub-carrier modulation function having first and second components with two different rates both of which are different to the code rate, the receiver comprising a processor arranged to:
generate a first estimate of delay based on the code modulation only;
generate a second estimate of delay based on the first component of the sub-carrier modulation only; and
generate a third estimate of delay based on the second component of the sub-carrier modulation only; and
determine a further delay estimate from the first, second and third delay estimates; and
wherein the processor is arranged in determining the further delay estimate, to calculate a first delay difference as the difference between the first and second estimates rounded to an integer number of first sub-carrier half cycles, and a second delay difference as the difference between the second and third estimates rounded to an integer number of second sub-carrier half cycles.

6. A receiver according to claim 5 wherein the processor is arranged, in determining the further delay estimate, to add the first delay difference to the second estimate of delay and the second delay difference to the third estimate.

7. A receiver for receiving a navigation signal comprising a carrier modulated by a code modulation function of a given code rate and further modulated by a composite sub-carrier modulation function having first and second components with two different rates both of which are different to the code rate, the receiver comprising a processor arranged to:
generate a first estimate of delay based on the code modulation only
generate a second estimate of delay based on the first component of the sub-carrier modulation only; and
generate a third estimate of delay based on the second component of the sub-carrier modulation only; and
determine a further delay estimate from the first, second and third delay estimates; and
wherein the processor is arranged to update the first and second estimates iteratively and to calculate the first delay difference and add it to the second estimate repeatedly; and to update the second and third estimates iteratively and to calculate the second delay difference and add it to the third estimate repeatedly.

8. A receiver for receiving a navigation signal comprising a carrier modulated by a code modulation function of a given code rate and further modulated by a composite sub-carrier modulation function having first and second components with two different rates both of which are different to the code rate, the receiver comprising a processor arranged to:
generate a first estimate of delay based on the code modulation only;
generate a second estimate of delay based on the first component of the sub-carrier modulation only; and
generate a third estimate of delay based on the second component of the sub-carrier modulation only; and
determine a further delay estimate from the first, second and third delay estimates; and
wherein the processor is arranged to update the first and second estimates iteratively until they converge towards respective final values, to update the second and third estimates iteratively until they converge towards respective final values, and to calculate the further delay estimate from the final values.

9. A receiver for receiving a navigation signal comprising a carrier modulated by a code modulation function of a given code rate and further modulated by a composite sub-carrier modulation function having first and second components with two different rates both of which are different to the code rate, the receiver comprising a processor arranged to:
generate a first estimate of delay based on the code modulation only;
generate a second estimate of delay based on the first component of the sub-carrier modulation only; and
generate a third estimate of delay based on the second component of the sub-carrier modulation only; and
determine a further delay estimate from the first, second and third delay estimates;
wherein the processor includes:
a reference code signal generator arranged to generate at least one reference code signal using the first estimate of delay;
a reference lower frequency sub-carrier signal generator arranged to generate at least one lower frequency reference sub-carrier signal using the second estimate of delay; and
a reference higher frequency sub-carrier signal generator arranged to generate at least one higher frequency reference sub-carrier signal using the third estimate of delay; and
a correlation generator arranged to generate correlations based on the reference signals and at least one component of the received signal;
wherein
the at least one lower frequency reference sub-carrier signal includes an early reference lower frequency sub-carrier signal and a late reference lower frequency sub-carrier signal separated by a gate width time difference; and at least one higher frequency reference sub-carrier signal includes an early reference higher frequency sub-carrier signal and a late reference higher frequency sub-carrier signal separated by a gate width time difference wherein the gate width time differences are variable;
the processor being arranged to vary the gate width time difference as the trial sub-carrier delay is updated;
wherein the processor is arranged in determining the further delay estimate, to calculate a first delay difference as the difference between the first and second estimates rounded to an integer number of first sub-carrier half cycles, and a second delay difference as the difference between the second and third estimates rounded to an integer number of second sub-carrier half cycles, and
the processor is arranged to detect a slip condition in the updating of one of the trial sub-carrier delays corresponding to a change in the estimated value of the associated integral number, and to increase the gate width time difference in response to the slip condition.

10. A receiver according to claim 9 wherein the processor is arranged to use the correlations to generate error estimations for the delay estimates, and to update the delay estimates based on the error estimations.

11. A receiver according to claim 9 wherein the at least one reference code signal includes an early reference code signal and a late reference code signal separated by a gate width time difference.

12. A receiver for receiving a navigation signal comprising a carrier modulated by a code modulation function of a given code rate and further modulated by a composite sub-carrier modulation function having first and second components with two different rates both of which are different to the code rate, the receiver comprising a processor arranged to:

generate a first estimate of delay based on the code modulation only;

generate a second estimate of delay based on the first component of the sub-carrier modulation only; and generate a third estimate of delay based on the second component of the sub-carrier modulation only; and determine a further delay estimate from the first, second and third delay estimates;

wherein the processor includes:

a reference code signal generator arranged to generate at least one reference code signal using the first estimate of delay;

a reference lower frequency sub-carrier signal generator arranged to generate at least one lower frequency reference sub-carrier signal using the second estimate of delay; and a reference higher frequency sub-carrier signal generator arranged to generate at least one higher frequency reference sub-carrier signal using the third estimate of delay; and a correlation generator arranged to generate correlations based on the reference signals and at least one component of the received signal; and wherein the correlation means is arranged to generate a plurality of correlations that vary in different ways as the trial delay approaches an actual delay and to combine them to determine the error estimation.

13. A receiver according to claim 12 wherein the processor is arranged to combine the correlations in a manner which varies as the delay approaches the actual delay to determine the error estimations.

* * * * *